(12) United States Patent
Sakamoto et al.

(10) Patent No.: US 8,924,140 B2
(45) Date of Patent: Dec. 30, 2014

(54) EXTERNAL ENVIRONMENT RECOGNITION DEVICE FOR VEHICLE AND VEHICLE SYSTEM USING SAME

(75) Inventors: Hiroshi Sakamoto, Hitachi (JP); Kazutoshi Tsuchiya, Hitachinaka (JP); Takehito Ogata, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 492 days.

(21) Appl. No.: 13/264,190

(22) PCT Filed: Apr. 13, 2010

(86) PCT No.: PCT/JP2010/056578
§ 371 (c)(1),
(2), (4) Date: Oct. 13, 2011

(87) PCT Pub. No.: WO2010/119860
PCT Pub. Date: Oct. 21, 2010

(65) Prior Publication Data
US 2012/0035846 A1   Feb. 9, 2012

(30) Foreign Application Priority Data

Apr. 14, 2009   (JP) ................................. 2009-098338

(51) Int. Cl.
| | | |
|---|---|---|
| G06F 17/10 | (2006.01) |
| G06G 7/78 | (2006.01) |
| G08G 1/16 | (2006.01) |
| G01S 13/93 | (2006.01) |
| G06K 9/00 | (2006.01) |
| G01S 13/86 | (2006.01) |
| B60T 8/1755 | (2006.01) |

(52) U.S. Cl.
CPC ........... B60T 8/17558 (2013.01); G01S 13/931 (2013.01); G08G 1/166 (2013.01); G06K 9/00805 (2013.01); G01S 13/867 (2013.01)
USPC ............. 701/301; 701/36; 701/96; 701/302; 340/435; 340/436; 340/901; 340/903

(58) Field of Classification Search
USPC ............. 701/36, 96, 301, 302; 340/435, 901, 340/903, 436, 438
See application file for complete search history.

(56) References Cited

U.S. PATENT DOCUMENTS 7,437,244 B2 * 10/2008 Okada .......................... 701/301
7,860,653 B2 * 12/2010 Joe et al. ...................... 701/301
(Continued)

FOREIGN PATENT DOCUMENTS

JP   2005-25458   1/2005
JP   2005-316607   11/2005
(Continued)

Primary Examiner — Khoi Tran
Assistant Examiner — Jaime Figueroa
(74) Attorney, Agent, or Firm — Antonelli, Terry, Stout & Kraus, LLP.

(57) ABSTRACT

An external environment recognition device for a vehicle and a vehicle system capable of assuring safety and reducing the processing load in a compatible manner are provided. An external environment recognition device 100 for a vehicle includes: first collision determination means 103 for computing a risk of collision of a host vehicle with a detected object in front of the host vehicle on the basis of information of a predicted course of the host vehicle and the detected object; and second collision determination means 104 for determining whether the detected object enters the predicted course from the outside of the predicted course or not. This device further includes object selection means 105 for selecting the detected object having a risk at least a first threshold and the detected object determined to enter the predicted course as selection candidate objects from among the detected objects, and for selecting the selection candidate object having a minimum relative distance to the host vehicle as a pedestrian determination request object from among the selected selection candidate objects. This device further includes pedestrian determination means 106 for determining whether the selected pedestrian determination request object is a pedestrian or not using image information.

8 Claims, 17 Drawing Sheets

(56) References Cited

U.S. PATENT DOCUMENTS

| | | | |
|---|---|---|---|
| 8,085,140 B2 * | 12/2011 | Mochizuki et al. | 340/438 |
| 8,340,883 B2 * | 12/2012 | Arbitmann et al. | 701/96 |
| 2004/0030499 A1 * | 2/2004 | Knoop et al. | 701/301 |
| 2004/0153217 A1 * | 8/2004 | Mattes et al. | 701/1 |
| 2005/0004761 A1 | 1/2005 | Takahama et al. | |
| 2005/0165550 A1 * | 7/2005 | Okada | 701/301 |
| 2006/0091728 A1 * | 5/2006 | Fulks et al. | 303/193 |
| 2008/0086269 A1 * | 4/2008 | Joe et al. | 701/301 |
| 2009/0303078 A1 * | 12/2009 | Mochizuki et al. | 340/901 |
| 2009/0326766 A1 * | 12/2009 | Wang | 701/46 |
| 2010/0228419 A1 * | 9/2010 | Lee et al. | 701/25 |
| 2010/0250064 A1 * | 9/2010 | Ota et al. | 701/36 |
| 2011/0205042 A1 * | 8/2011 | Takemura et al. | 340/435 |
| 2011/0246156 A1 * | 10/2011 | Zecha et al. | 703/6 |
| 2011/0285574 A1 * | 11/2011 | Tsunekawa | 342/70 |

FOREIGN PATENT DOCUMENTS

| | | |
|---|---|---|
| JP | 2006-107313 | 4/2006 |
| JP | 2007-114831 | 5/2007 |
| JP | 2007-251257 | 9/2007 |
| JP | 2009-9209 | 1/2009 |
| WO | WO 2008029802 A1 * | 3/2008 |

\* cited by examiner (a)

(b)

(a)

| No | Condition | | | Image processing region setting pattern |
|---|---|---|---|---|
| | Lateral velocity VXR[i] | Risk D1[i] | Determination flag fRMVLAT[i] | |
| 1 | ≤ 0.5m/s | ≥ 0 | 0 | (A) |
| 2 | ≥ 0.5m/s | < 0 | 1 | (B) |
| 3 | ≥ 0.5m/s | ≥ 0 | 1 | (C) |

(b)

Accident types of pedestrian casualties in terms of age bracket
(Pedestrian is primary or secondary party; total of 2001-2003)

(a)

(b)

EXTERNAL ENVIRONMENT RECOGNITION DEVICE FOR VEHICLE AND VEHICLE SYSTEM USING SAME

TECHNICAL FIELD

The present invention relates to an external environment recognition device for a vehicle that determines whether an object detected by a distance measuring sensor, such as a radar, is a pedestrian or not on the basis of information from the distance measuring sensor and an image sensor, such as a camera, and to a vehicle system using the same.

BACKGROUND ART

Fatal pedestrian accidents represent approximately 30% of the entire fatal traffic accidents in Japan. Particularly in Tokyo, it is said that the proportion of the fatal pedestrian accidents reaches to approximately 40%. In order to reduce such fatal pedestrian accidents, a safe driving support system utilizing an environment recognition sensor, such as a radar and a camera is effective. JP Patent Publication (Kokai) No. 2007-114831A (2007) proposes a system that detects an object, such as a pedestrian, using a radar and a camera. This method enables the attribute of an object to be determined according to a distance and a reflection intensity of the object detected by the radar, and allows individual identification using an image data taken by the camera according to the attribute.

JP Patent Publication (Kokai) No. 2005-025458A (2005) describes a system that causes a camera to redundantly capture an object detected by a distance measuring sensor, such as a radar. First, this system predicts a course of a host vehicle as a turning radius using a vehicle velocity, a steering angle and a yaw rate, and determines a collision possibility of the host vehicle according to the predicted course and a relative position of the object detected by the radar. Further, this system calculates a relative velocity vector from an amount of change of the relative position of the object detected by the radar, and determines the collision possibility of the host vehicle according to the relative velocity vector.

This system then selects a target of image processing from the object detected by the radar, while emphasizing a result of a collision determination according to the predicted course for an object with a small longitudinal relative velocity and emphasizing a result of a collision determination according to the relative velocity vector for an object with a large longitudinal relative velocity. This invention enables the collision possibility to be appropriately determined in a scene where approaching a low-velocity vehicle traveling in front after steering and avoiding a stopped vehicle in front of the host vehicle, and allows an image processing load to be reduced.
[Patent Document 1]
 JP Patent Publication (Kokai) No. 2007-114831A (2007)
[Patent Document 2]
 JP Patent Publication (Kokai) No. 2005-025458A (2005)

DISCLOSURE OF THE INVENTION

Problems to be Solved by the Invention

However, as described in JP Patent Publication (Kokai) No. 2007-114831A (2007), a system that individually identifies an object detected by a radar using image data taken by a camera, for instance, a system of recognizing a pedestrian, requires to perform image processing while narrowing down objects to be subjected to the image processing, because if it is intended to improve recognition accuracy for enormous patterns of pedestrians, an image processing logic becomes complex and the processing load is increased.

As shown in a left diagram of FIG. 17(a), the system described in JP Patent Publication (Kokai) No. 2005-025458A (2005) has a problem that places priority on a pedestrian A as a target of the image processing in a case where "the pedestrian A far from the host vehicle and immobile on the predicted course of the host vehicle" and "a pedestrian B crossing from the outside of the predicted course of the host vehicle" exist at the same time. In particular, in a case where the host vehicle traveling at a low vehicle velocity and a pedestrian hastens to diagonally cross in front thereof, a crossing pedestrian 1712 is selected as a target of the image processing after entering a predicted course 1704 as shown in a right diagram of FIG. 17(a). Accordingly, there is a possibility that a safe driving support system does not effectively operate owing to delay of recognition.

The present invention is made in view of the above points. It is an object of the present invention to provide an external environment recognition device for a vehicle that compatibly realizes to assure safety and reduce the processing load, and a vehicle system using the same.

Means for Solving the Problems

An invention of an external environment recognition device for a vehicle for solving the problems is an external environment recognition device for a vehicle that recognizes an external environment of the vehicle on the basis of detected object information of a plurality of detected objects in front of a host vehicle, image information of an image in front of the host vehicle, and host vehicle information of a detected status of the host vehicle, including: predicted course setting means for setting a predicted course of the host vehicle on the basis of the host vehicle information; first collision determination means for computing a risk of collision of each of the detected objects with the host vehicle on the basis of the predicted course set by the predicted course setting means and the detected object information; second collision determination means for determining whether each of the detected objects enters the predicted course from outside of the predicted course or not on the basis of the predicted course and the detected object information; object selection means for selecting the detected object having the risk computed by the first collision determination means at least a preset first threshold and the detected object determined by the second collision determination means to enter the predicted course as selection candidate objects among the detected objects, and for selecting the selection candidate object having a minimum relative distance to the host vehicle or a minimum predicted collision time as a pedestrian determination request object from among the selected selection candidate objects; and pedestrian determination means for determining whether the pedestrian determination request object selected by the object selection means is a pedestrian or not using the image information.

The object selection means preferably selects a plurality of selection candidate objects. In a case where the selection candidate object selected as the pedestrian determination request object in a last process is included in the selected selection candidate objects, the object selection means identifies the selected selection candidate object as a reselection candidate object, and determines whether to omit the reselection candidate object from a selection candidate of the pedestrian determination request object or not on the basis of the predicted course and the detected object information.

The pedestrian determination means preferably performs a process of setting an image processing region of the image information according to a result of determination by the first collision determination means on the pedestrian determination request object and a result of determination by the second collision determination means.

Advantages of the Invention

According to the present invention, the detected object determined by the first collision determination means to have a risk at least the first threshold and the detected object determined by the second collision determination means to enter the predicted course from the outside of the predicted course are selected as selection candidate objects from among the detected objects. The selection candidate object having the minimum relative distance to the host vehicle or the minimum predicted collision time are selected as the pedestrian determination request object from among the selection candidate objects. This allows a crossing pedestrian that is in proximity to the host vehicle and has a high collision possibility to be preferentially selected as the pedestrian determination request object. In particular, this allows delay in recognition to be avoided in a case where the host vehicle travels at a low vehicle velocity and a pedestrian in front hastens to diagonally cross the predicted course of the host vehicle.

Accordingly, the pedestrian can be detected quickly and securely, and safety of the pedestrian can be assured. Further, the processing region of the image information can appropriately be set, and the processing region can be set smaller, thereby allowing the image processing load on the device to be reduced.

According to the present invention, in a case where the selection candidate object selected as the pedestrian determination request object in the last process is included in the selection candidate objects, the selected selection candidate object is identified as the reselection candidate object. It is then determined whether to omit the reselection candidate object from the selection candidate of the pedestrian determination request object or not on the basis of the predicted course and the detected object information.

Accordingly, the pedestrian determination request object can immediately be switched. For instance, in a case where the pedestrian selected as the pedestrian determination request object passes the front of the host vehicle and subsequently a newly crossing pedestrian appears, the newly appearing crossing pedestrian can be selected as the pedestrian determination request object. Accordingly, the processing load on the pedestrian determination means can be reduced.

Further, in a case where the selected pedestrian determination request object is moving in the vehicle width direction of the host vehicle (i.e. the lateral direction), the image processing region in the image information is shifted in the moving direction of the pedestrian determination request object, and a limitation value on the image processing region is provided according to the moving direction and the predicted course of the host vehicle. This allows assuring safety and reducing the processing load in a compatible manner.

This specification incorporates contents described in the specification and/or drawings of Japanese Patent Application No. 2009-098338, which is a basis of the priority right of this application.

DESCRIPTION OF SYMBOLS

100 . . . external environment recognition device for a vehicle, 101 . . . object information acquisition means, 102 . . . predicted course setting means, 103 . . . first collision determination means, 104 . . . second collision determination means, 105 . . . object selection means, 106 . . . pedestrian determination means, 107 . . . fusion means, 108 . . . integrated collision determination means, 200 . . . control device

BEST MODE FOR CARRYING OUT THE INVENTION

Embodiments of an external environment recognition device 100 for a vehicle and a vehicle system 1 using the same according to this embodiment will hereinafter be described in detail with reference to FIGS. 1 to 19.

Figure 1:
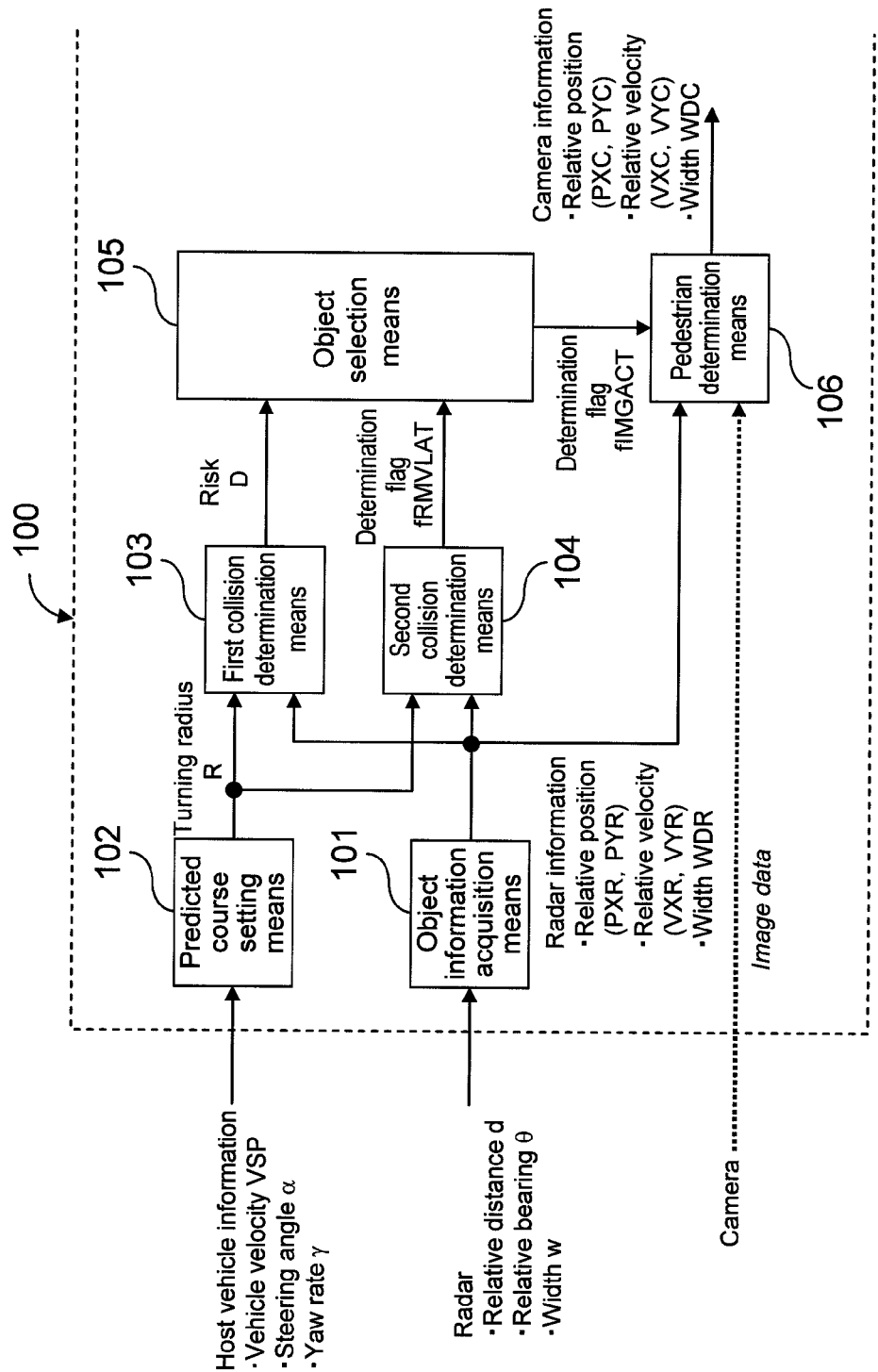
FIG. 1 is a functional block diagram showing a configuration of an external environment recognition device for a vehicle according to this embodiment.
Figure 2:
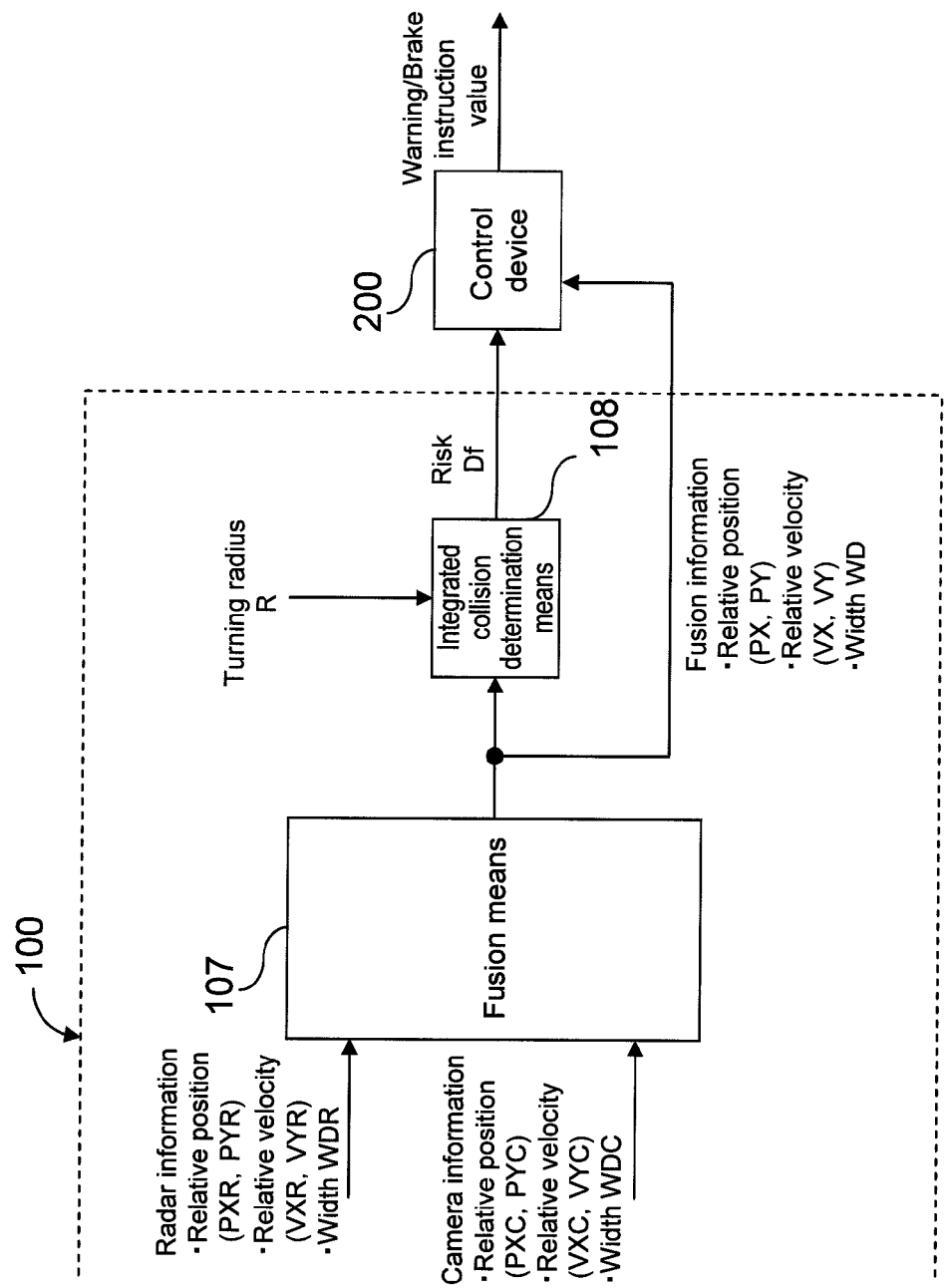
FIG. 2 is a functional block diagram showing the external environment recognition device for a vehicle according to this embodiment and a control device of a vehicle system using the same.

First, referring to FIGS. 1 and 2, processing details of the external environment recognition device 100 for a vehicle according to the present invention will be described. FIGS. 1 and 2 are block diagrams showing the embodiments of the external environment recognition device 100 for a vehicle and a control device 200, which is a configurational element of the vehicle system 1 using the same.

The processing details to be described below are programmed in the external environment recognition device 100 for a vehicle, and repeatedly executed at a predetermined cycle.

In FIG. 1, object information acquisition means 101 acquires information of a distance d[i] (m) to an object, a bearing θ[i] (rad) and a width w[i] (rad) detected by a radar as a distance measuring sensor, executes an interface process that converts the acquired signal, and thereby computes a relative position (hereinafter, referred to as a lateral position) PXR[i] (m) of the object with respect to a host vehicle in the vehicle width direction, a relative position (hereinafter, referred to as a longitudinal position) PYR[i] (m) with respect to the host vehicle in the direction of the entire length, a relative velocity (hereinafter, referred to as a lateral velocity) VXR[i] (m/s) with respect to the host vehicle in the vehicle width direction, a relative velocity (hereinafter, referred to as a longitudinal velocity) VYR[i] (m/s) with respect to the host vehicle in the direction of the entire length, and a width WDR[i] (m) of the object along the vehicle width direction of the host vehicle, as laser information. Here, i represents an object ID number in a case where the radar detects a plurality of objects. The details of the interface process will be described later.

Predicted course setting means 102 acquires host vehicle information, such as a vehicle velocity VSP, a steering angle α and a yaw rate γ, according to detection signals from sensors for detecting states of the host vehicle, such as a vehicle velocity sensor, a steering angle sensor and a yaw rate sensor, which are not shown, and executes a process of computing a predicted course of the host vehicle according to the acquired host vehicle information. Here, a turning radius R (m) is computed as the predicted course of the host vehicle. A method of computing the turning radius R will be described later. The host vehicle information may be acquired by directly inputting the signals from the respective sensors into the external environment recognition device 100 for a vehicle. Instead, in a case where the sensor signals have been input into other control devices, this information may be acquired through communication with the control devices using a LAN (Local Area Network).

First collision determination means 103 computes a risk D1[i] according to the turning radius R(m) acquired by the predicted course setting means 102 and the lateral position PXR[i] (m) and the longitudinal position PYR[i] (m) as the radar information acquired by the object information acquisition means 101. Here, the risk D1[i] is a value representing how close the object detected by the radar is to the center of the predicted course of the host vehicle.

The first collision determination means 103 computes a risk D2[i] according to the lateral position PXR[i] (m), the longitudinal position PYR[i] (m), the lateral velocity VXR[i] (m/s) and the longitudinal velocity VYR[i] (m/s). Here, the risk D2[i] is a value representing a degree of relative velocity vector of the object detected by the radar approaching the host vehicle.

The first collision determination means 103 weights the risks D1[i] and D2[i] according to the longitudinal velocity VYR[i] (m/s) and thereby computes the risk D[i]. Methods of computing the risks D1[i], D2[i] and D[i] will be described later.

Second collision determination means 104 computes a determination flag fRMVLAT[i] according to the turning radius R acquired by the predicted course setting means 102 and the lateral position PXR[i] (m), the longitudinal position PYR[i] (m), the lateral velocity VXR[i] (m/s) and the longitudinal velocity VYR[i] (m/s) as the radar information acquired by the object information acquisition means 101. Here, the determination flag fRMVLAT[i] is a flag representing whether or not the object detected by the radar crosses the predicted course of the host vehicle after a prescribed time elapses. A method of computing the determination flag fRMVLAT[i] will be described later.

Object selection means 105 computes the determination flag fIMGACT[i] according to the risk D[i] acquired by the first collision determination means 103 and the determination flag fRMVLAT[i] acquired by the second collision determination means 104. Here, the determination flag fIMGACT[i] is a flag representing whether the image processing determines the object detected by the radar as a pedestrian or not. A method of computing the determination flag fIMGACT[i] will be described later.

Pedestrian determination means 106 determines whether it is a pedestrian or not by the image processing on the basis of the determination flag fIMGACT[i] acquired by the object selection means 105, the radar information (the lateral position PXR[i] (m), the longitudinal position PYR[i] (m), the lateral velocity VXR[i] (m/s), the longitudinal velocity VYR[i] (m/s) and the width WDR[i] (m)) of the object acquired by the object information acquisition means 101, and data of an image in front of the host vehicle taken by the camera.

If it is determined to be a pedestrian, camera information of the pedestrian (the lateral position PXC[i] (m), the longitudinal position PYC[i] (m), the lateral velocity VXC[i] (m/s), the longitudinal velocity VYC[i] (m/s) and the width WDC[i] (m) of the pedestrian) is computed. A method of determining whether it is a pedestrian or not by the image processing will be described later. Here, i is an object ID number in a case where the image processing recognizes a plurality of pedestrians.

In FIG. 2, fusion means 107 integrates the radar information (the lateral position PXR[i] (m), the longitudinal position PYR[i] (m), the lateral velocity VXR[i] (m/s), the longitudinal velocity VYR[i] (m/s) and the width WDR[i] (m)) of the object acquired by the object information acquisition means 101 and the camera information (the lateral position PXC[i] (m), the longitudinal position PYC[i] (m), the lateral velocity VXC[i] (m/s), the longitudinal velocity VYC[i] (m/s) and the width WDC[i] (m)) acquired by the pedestrian determination means 106, and thereby generates fusion information that is information of the lateral position PX[i] (m), the longitudinal position PY[i] (m), the lateral velocity VX[i] (m/s), the longitudinal velocity VY[i] (m/s) and the width WD[i] (m) of the pedestrian. A method of generating the fusion information will be described later. Here, i is an object ID number in a case where the fusion generates a plurality of pieces of the pedestrian information.

Integrated collision determination means 108 computes a risk Df1[i], according to the turning radius R acquired by the predicted course setting means 102, and the lateral position PX[i] (m) and the longitudinal position PY[i] (m) of the object acquired by the fusion means 107. Here, the risk Df1[i] is a value representing how close the pedestrian recognized by the fusion means 107 is to the center of the predicted course of the host vehicle.

The integrated collision determination means 108 computes a risk Df2[i] according to the fusion information (the lateral position PX[i] (m), the longitudinal position PY[i] (m), the lateral velocity VX[i] (m/s) and the longitudinal velocity VY[i] (m/s)) of the pedestrian. Here, the risk Df2[i] is a value representing a degree of the relative velocity vector of the pedestrian recognized by the fusion means 107 approaching the host vehicle.

Further, the integrated collision determination means 108 weights the risks Df1[i] and Df2[i] according to the longitudinal velocity VY[i] (m/s), and thereby computes the risk Df[i]. Methods of computing the risks Df1[i], Df2[i] and Df[i] will be described later.

As shown in FIG. 2, the external environment recognition device 100 for a vehicle outputs the fusion information generated by the fusion means 107 and the risk Df[i] acquired by the integrated collision determination means 108 to the control device 200 by means of communication using the LAN (Local Area Network).

The control device 200 computes a warning/brake instruction value according to the fusion information input from the fusion means 107 of the external environment recognition device 100 for a vehicle and the risk Df[i] input from the integrated collision determination means 108 of the external environment recognition device 100 for a vehicle, and thereby operates a warning device and a braking device, which are not shown. A method of computing the warning/brake instruction value will be described later.

Next, referring to FIG. 3, processing details of the object information acquisition means 101 will be described.

Figure 3:
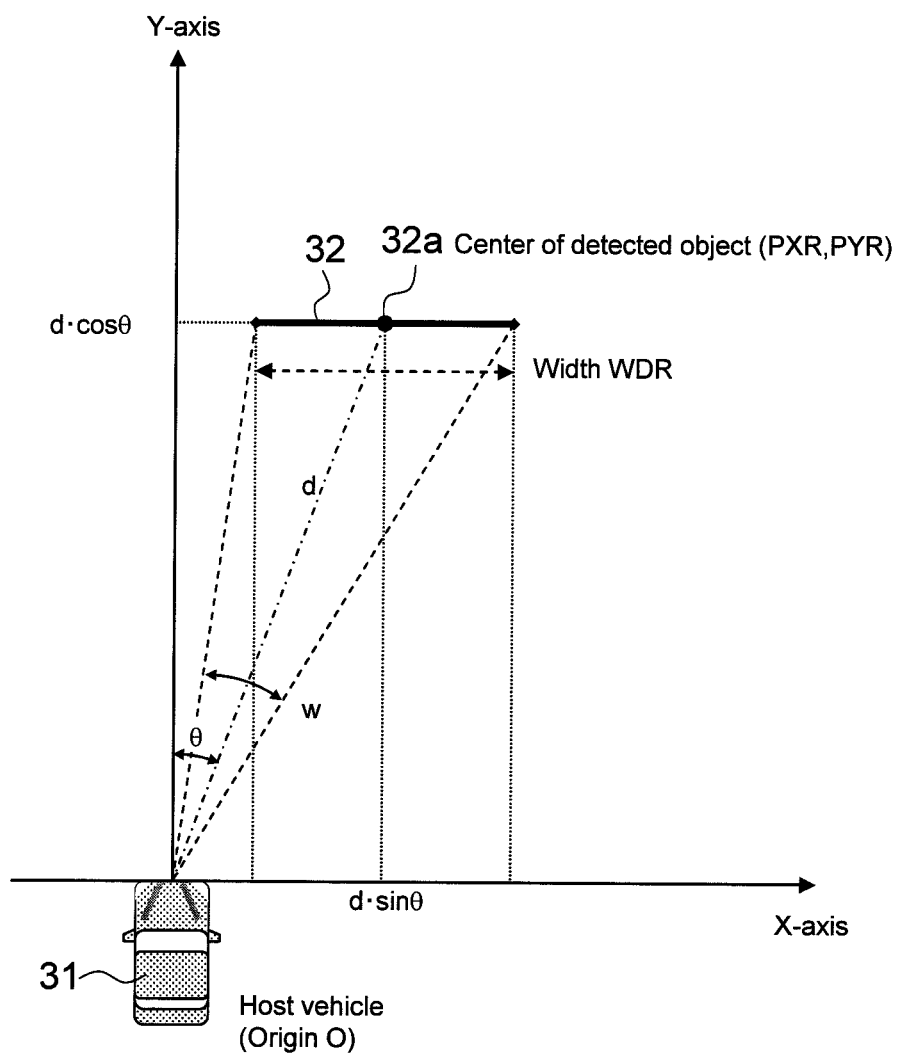
FIG. 3 is a schematic diagram for illustrating processing details of object information acquisition means.

FIG. 3 is a schematic diagram for illustrating the processing details of the object information acquisition means.

The object information acquisition means 101 acquires the distance d[i] to the center 32a of the object 32 detected by the radar, the bearing θ[i] and the width w[i], and converts these into information in a two-dimensional relative coordinate system (X-Y coordinate) whose origin point O is at the host vehicle 31. For instance, in a case where the bearing θ[i] of the object 32 is given by an angle θ between the traveling direction of the host vehicle 31 (the Y-axis of the relative coordinate system) and the relative position vector of the object 32 detected by the radar, the lateral position PXR[i] and the longitudinal position PYR[i] of the object 32 are calculated by a following Expression (1).

$$(PXR[i], PYR[i]) = (d \cdot \sin \theta, d \cdot \cos \theta) \quad (1)$$

The radar width WDR[i], which is the lateral width of the object 32 along the vehicle width direction of the host vehicle 31, is represented by a following Expression (2).

$$WDR[i] = PYR[i] \times \{\tan(\theta + w/2) - \tan(\theta - w/2)\} \quad (2)$$

The lateral velocity VXR[i] and the longitudinal velocity VYR[i] are calculated by pseudo-differentiating the lateral position PXR[i] and the longitudinal position PYR[i], as shown in following Expressions (3) and (4). Values acquired by applying filter processes, such as low-pass filters, to the respective pseudo-differentiated values as required may be used.

$$VXR[i] = (PXR[i] - PXRz[i])/Ts \quad (3)$$

$$VYR[i] = (PYR[i] - PYRz[i])/Ts \quad (4)$$

where Ts is a sampling cycle and PXRz[i] and PYRz[i] are values one cycle previous to the lateral position PXR[i] and longitudinal position PYR[i] respectively. The information may be acquired by directly inputting the signals from the radar into the external environment recognition device 100 for a vehicle, or by communication with the other control devices using the LAN (Local Area Network) in a case where the signals from the radar have been input into the other control devices.

Next, referring to FIG. 4, the predicted course setting means 102 of the external environment recognition device 100 for a vehicle will be described.

Figure 4:
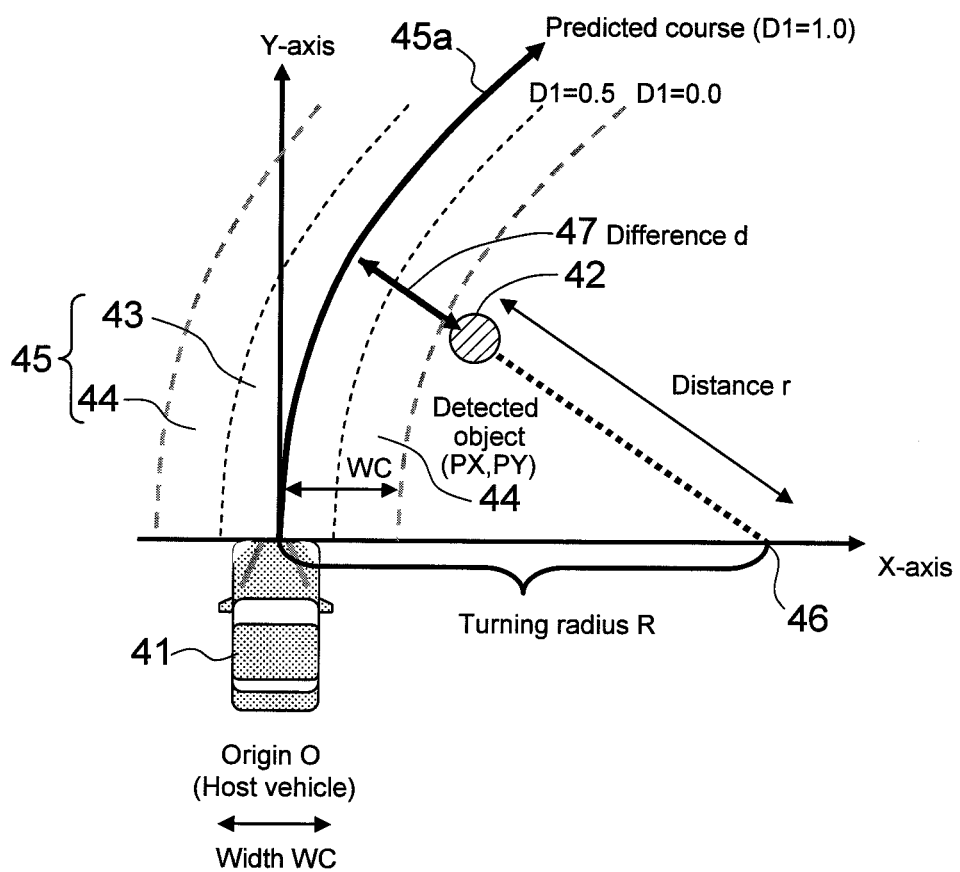
FIG. 4 is a schematic diagram for illustrating processing details of predicted course setting means and a method of computing a risk D1[i] in first collision determination means.

FIG. 4 is a schematic diagram showing processing details of the predicted course setting means 102.

As shown in FIG. 4, provided that the position of the host vehicle 41 is the origin point O, the predicted course 45 can be approximated by a circular arc of the turning radius R where the center line 45a of the predicted course 45 passes through the origin point O. The predicted course 45 includes a central region 43, and side regions 44 assigned along both the left and right sides of the central region 43. The central region 43 has a size approximately equal to the vehicle width of the host vehicle 41 and the side region 44 is set to be half the vehicle width.

The turning radius R is represented by a following Expression (5) using a steering angle α, a velocity VSP, a stability factor A, a wheelbase L and a steering gear ratio Gs of the host vehicle 41.

$$R = (1 + A \cdot VSP^2) \times (L \cdot Gs/\alpha) \quad (5)$$

where the stability factor controls steering characteristics of the vehicle 41 by a positive or negative sign of this factor and is an important value that acts as an indicator representing a magnitude of changing dependent on the velocity of stationary circular turning of the vehicle 41. As can be understood from the above Expression (5), the turning radius R changes in proportion to the square of the velocity VSP of the host vehicle 41 with a coefficient of stability factor A. The turning radius R can be represented by a following Expression (6) using the vehicle velocity VSP and the yaw rate γ of the host vehicle 41.

$$R = VSP/\gamma \quad (6)$$

As described above, use of host vehicle information including the vehicle velocity VSP, the steering angle α and the yaw rate γ enables the predicted course 45 of the host vehicle 41 to be approximated using the circular arc of the turning radius R.

Figure 5:
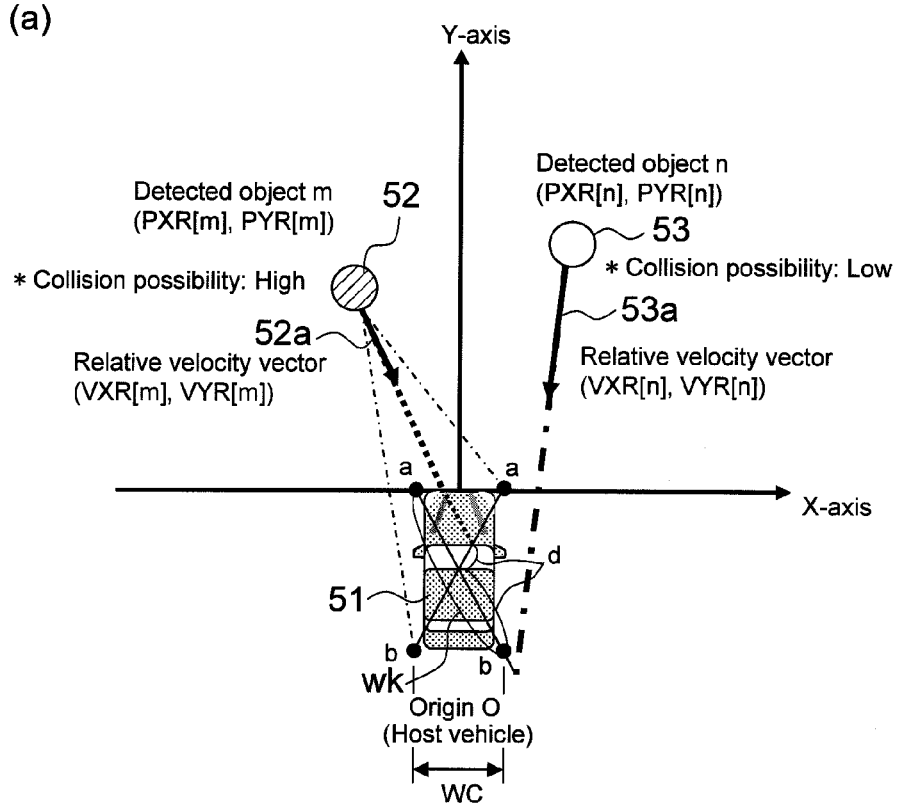
FIG. 5 is a schematic diagram for illustrating a method of computing a risk D2[i] in the first collision determination means.
Figure 5:
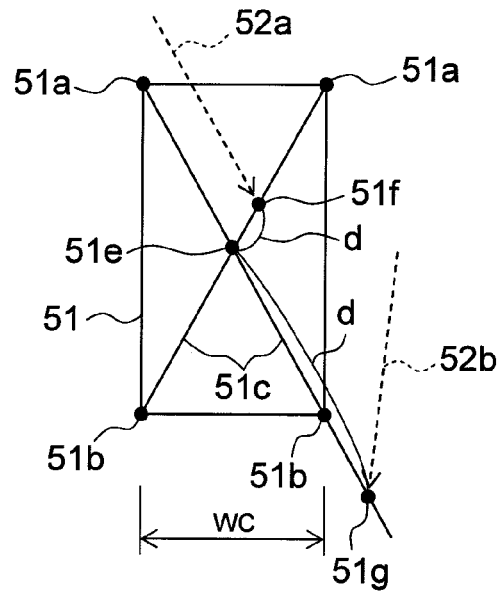

Next, referring to FIGS. 4 and 5, processing details of the first collision determination means 103 of the external environment recognition device 100 for a vehicle will be described.

First, referring to FIG. 4, a method of computing the risk D1[i] of the first collision determination means 103 will be described.

Provided that the lateral position of the object 42 detected by the radar is PXR[i] and the longitudinal position is PXR[i], the distance r from the center 46 of the circular arc drawn by the turning radius R to the object 42 is represented by a following Expression (7).

$$(R - PXR[i])^2 + PYR[i]^2 = r^2 \quad (7)$$

A radius difference δ between the turning radius R and the distance r can be acquired by a following Expression (8).

$$\delta = |R - r| \quad (8)$$

According to FIG. 4, the smaller the radius difference δ of the above Expression (8), the closer the detected object 42 approaches to the center line 45a of the predicted course 45 of the host vehicle 41. Therefore, it can be determined that the risk is high. The risk D1[i] is calculated by a following Expression (9) using the radius difference δ and the vehicle width WC of the host vehicle 41.

$$D1[i]=1-\delta/WC \quad (9)$$

As can be understood from the above Expression (9), the risk of the object 42 having a radius difference δ, which is a distance from the center line 45a of the predicted course 45 to the object 42, within the vehicle width WC (d≤WC) is at least zero (D1[i]≥0); the risk of the object 42 having a radius difference δ at least the vehicle width WC (d>WC) is a value less than zero (D1[i]<0).

Next, referring to FIG. 5, a method of computing the risk D2[i] of the first collision determination means 103 will be described.

FIG. 5(a) is a schematic diagram showing the method of computing the risk D2[i]. FIG. 5(b) is a schematic diagram showing an enlarged view of a host vehicle 51 part in FIG. 5(a).

In a case of a situation shown in FIG. 5(a), provided that the lateral position of the detected object m 52 detected by the radar is PXR[m] and the longitudinal position thereof is PYR[m], the relative velocity vector (VXR[m], VYR[m]) of the detected object m 52 acquired by pseudo-differentiating these positions indicates the host vehicle 51 and is expected to intersect with the X-axis in the host vehicle width. Accordingly, it can be determined that the detected object m 52 has a high collision possibility of colliding with the host vehicle 51.

On the other hand, provided that the lateral position of the detected object n 53 detected by the radar is a PXR[n] and the longitudinal position thereof is a PYR[n], the relative velocity vector (VXR[n], VYR[n]) of the detected object n 53 acquired by pseudo-differentiating these positions is expected not to intersect with the X-axis in the host vehicle width and not to intersect with a side of the host vehicle 51. Accordingly, it can be determined that the detected object n 53 has a low collision possibility of colliding with the host vehicle 51.

As to the risk D2[i], as shown in FIG. 5(b), intersection points 51f and 51g of a diagonal line 51c that connect points 51a and 51b residing at diagonal points of the host vehicle 51 to the relative velocity vectors 52a and 53a are acquired; the risk D2[i] is acquired by a following Expression (10) using the distance d between the intersection points 51f and 51g and the midpoint 51e of the diagonal line 51c and the length WK of the diagonal line 51c between the points 51a and 51b.

$$D2[i]=1-d/WK \quad (10)$$

As can be understood from the above Expression (10), the risk D2 of the object where the distance d from the midpoint 51e of the diagonal line 51c to the intersection points 51f and 51g is within the length WK of the diagonal line 51c between the points 51a and 51b (d≤WK) is at least zero; the risk D2 of the object where the distance d is larger than the length WK of the diagonal line 51c is a value smaller than zero.

For instance, since as to the object 52 the distance d from the midpoint 51e of the diagonal line 51c to the intersection point 51f is within the length WK (d≤WK), the risk D2 of the object 52 is at least zero (D2[i]≥0); since as to the object 53 the distance d from the midpoint 51e of the diagonal line 51 to the intersection point 51g is larger than the length WK (d>WK), the risk D2 of the object 53 is a value less than zero (D2[i]<0).

As described above, the relative velocity vector is acquired from the object information detected by the radar, and then the intersection point of the relative velocity vector with the host vehicle 51 is acquired, thereby allowing the collision possibility to be determined.

In a case where the longitudinal velocity of the object detected by the radar is comparable with the velocity of the host vehicle, the longitudinal relative velocity of the object becomes smaller and the risk D2[i]<0. Accordingly, it is preferable that the determination be made using both the risks D1[i] and D2[i]. The risk D[i] of the first collision determination means 103 is calculated by Expressions (11) and (12).

$$K[i]=f(VYR[i]) \quad (11)$$

$$D[i]=K[i] \times D1[i]+(1-K[i]) \times D2[i] \quad (12)$$

Here, a weight coefficient K (0 to 1) is a parameter for adjustment according to the longitudinal relative velocity of the object. In a case where the longitudinal velocity VYR[i] of the object detected by the radar is large in a direction approaching the host vehicle, the weight coefficient is set by a function f to K=0. The weight coefficient is set to gradually increase to K=1 with reduction in the longitudinal velocity VYR[i] in the direction approaching the host vehicle. In a case where the longitudinal velocity VYR[i] of the object detected by the radar is in a direction leaving the host vehicle, the weight coefficient is K=0.

As described above, the risks D1[i] and D2[i] are integrated according to the longitudinal velocity VYR[i] of the object detected by the radar, and the risk D[i] is acquired. Determination of the collision possibility by the risk D[i] allows the collision possibility to be appropriately determined in various scenes, such as a case where the longitudinal velocity of the object detected by the radar is comparable with the velocity of the host vehicle.

Next, referring to FIGS. 6 and 7, processing details of the second collision determination means 104 will be described.

Figure 6:
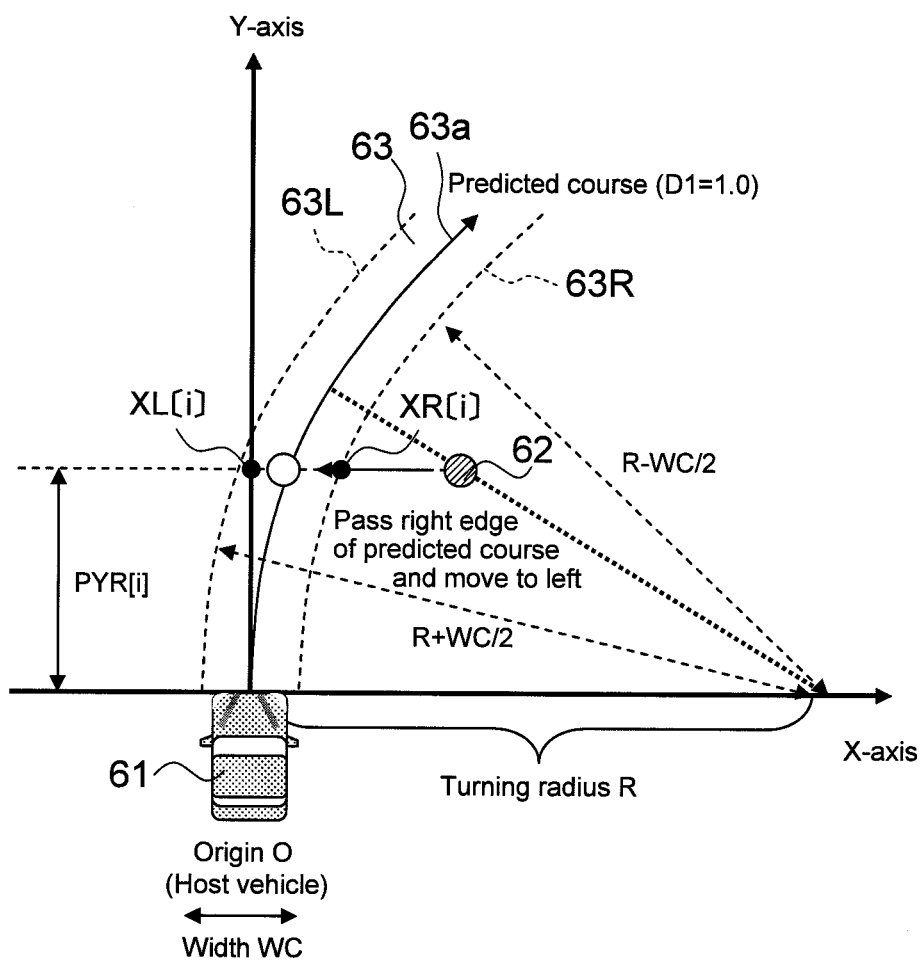
FIG. 6 is a schematic diagram showing a case where an object detected by a radar passes along the right edge of a predicted course and moves to the left in the vehicle width direction of a host vehicle.

FIG. 6 shows a case where the object 62 detected by the radar passes through the right edge 63R of the predicted course 63 and moves to the left in the vehicle width direction of the host vehicle 61. As shown in FIG. 6, the second collision determination means 104 determines whether the object 62 detected outside of the predicted course 63 crosses the predicted course 63 or not.

Figure 7:
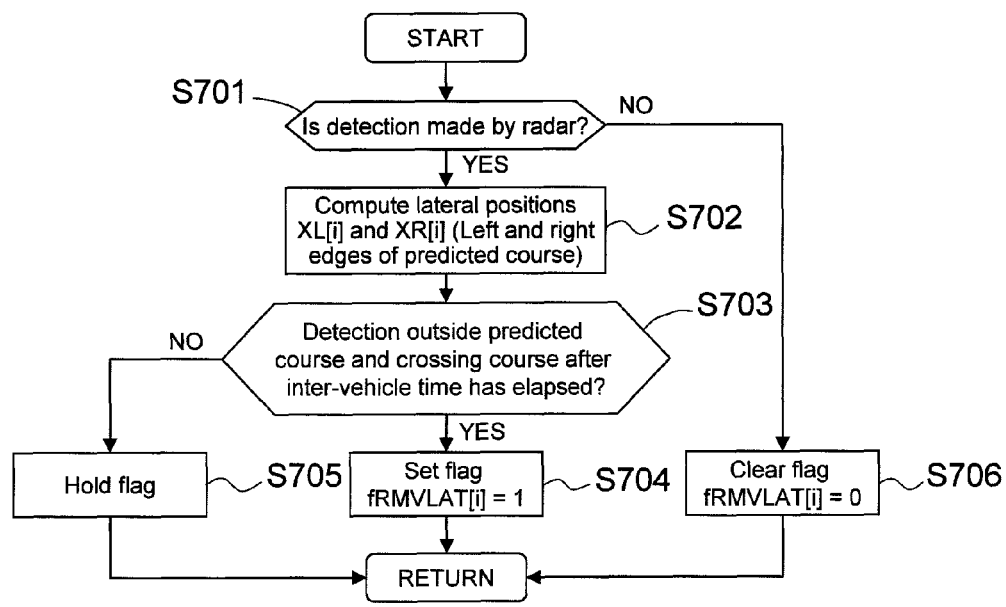
FIG. 7 is a flowchart showing processing details of second collision determination means.

FIG. 7 is a flowchart showing processing details of the second collision determination means 104.

First, in step S701, it is determined whether the radar detects the object 62 or not. If not detected, the processing proceeds to step S706, and the flag fRMVLAT[i] for determining whether the object 62 detected outside of the predicted course 63 crosses the predicted course 63 or not is cleared.

If the radar detects the object 62 in step S701, the processing proceeds to step S702; the radar information (the longitudinal position PYR[i], the lateral position PXR[i], the longitudinal velocity VYR[i] and the lateral velocity VXR[i]) of the object 62 detected by the radar, and the turning radius R set by the predicted course setting means 102 are read; the lateral positions XL[i] and XR[i] of the right and left edges 63R and 63L (circular arcs apart from the center 63a of the predicted course 63 by half of the vehicle width WC of the host vehicle 61) of the predicted course 63 in the longitudinal position PYR[i] are calculated.

As can be understood from FIG. 6, equations for acquiring the lateral positions XL[i] and XR[i] of the right and left edges 63R and 63L of the predicted course 63 in the longitudinal position PYR[i] are represented by following Expressions (13) and (14).

$$\text{left edge: } (R-X)^2+Y^2=(R+WC/2)^2 \quad (13)$$

$$\text{right edge: } (R-X)^2+Y^2=(R-WC/2)^2 \quad (14)$$

Accordingly, the lateral positions XL[i] and XR[i] can be acquired by Expressions (15) and (16).

Here, a function sqrt{ } is a function for calculating a square root of a value in { }.

$$XL[i]=R-\text{sqrt}\{(R+WC/2)^2-PYR[i]^2\} \quad (15)$$

$$XR[i]=R-\text{sqrt}\{(R-WC/2)^2-PYR[i]^2\} \quad (16)$$

Next, in step S703, it is determined whether the object 62 detected by the radar outside of the predicted course 63 crosses the predicted course 63 or not (whether to enter the predicted course 63 from the outside of the predicted course 63 or not) after an inter-vehicle time (a time in which the host vehicle 61 reaches the longitudinal position PYR[i]) has elapsed. More specifically, in a case where any of following Conditions (17) and (18) is satisfied, the determination is made.

$$PXR[i] \le XL[i] \text{ and } PXRTHW[i] \ge XL[i] \quad (17)$$

$$PXR[i] \ge XR[i] \text{ and } PXRTHW[i] \le XR[i] \quad (18)$$

where Condition (17) is a condition for determining the object that passes the left edge 63L of the predicted course 63 and moves to the right along the vehicle width direction of the host vehicle 61. Condition (18) is a condition for determining the object that passes through the right edge 63R of the predicted course 63 and moves to the left along the vehicle width direction of the host vehicle 61. In Conditions (17) and (18), the inter-vehicle time THWR[i] and the lateral position PXRTHW[i] after the inter-vehicle time has elapsed are represented by following Expressions (19) and (20).

$$THWR[i]=PYR[i]/VSP \quad (19)$$

$$PXRTHW[i]=PXR[i]+VXR[i] \times THWR[i] \quad (20)$$

In step S703, in a case where any of Conditions (17) and (18) is satisfied, detection has been made outside of the predicted course 63 and it is determined whether the object is crossing the predicted course 63 after the inter-vehicle time has elapsed, the processing proceeds to step S704, the determination flag fRMVLAT[i] is set and the processing is finished. In step S703, in a case where neither Conditions (17) nor (18) is satisfied, the processing proceeds to step S705, the value of the determination flag fRMVLAT[i] is held and the processing is finished.

As described above, the determination flag fRMVLAT[i] is calculated according to the information of the object 62 (the longitudinal position PYR[i], the lateral position PXR[i], the longitudinal velocity VYR[i] and the lateral velocity VXR[i]) acquired by the object information acquisition means 101 and the predicted course 63 (the turning radius R) set by the predicted course setting means 102, thereby allowing determining whether or not the object 62 detected outside the predicted course 63 crosses the predicted course 63 after the inter-vehicle time has elapsed.

The lateral velocity VXR[i] of the object 62 detected by the radar is a relative value with respect to the host vehicle 61. Accordingly, the second collision determination means 104 determines whether the host vehicle 61 is in a straight traveling state or not using values, such as the steering angle a and the yaw rate γ as the host vehicle information. It is preferable that the determination be made provided that the host vehicle 61 is in a straight traveling state. More specifically, in step S703, it is determined whether the host vehicle 61 is in the straight traveling state or not according to a condition that the steering angle a is within a prescribed value or a condition that the yaw rate y is within a prescribed value.

Next, referring to FIGS. 8, 9 and 10, processing details of the object selection means 105 will be described.

Figure 8:
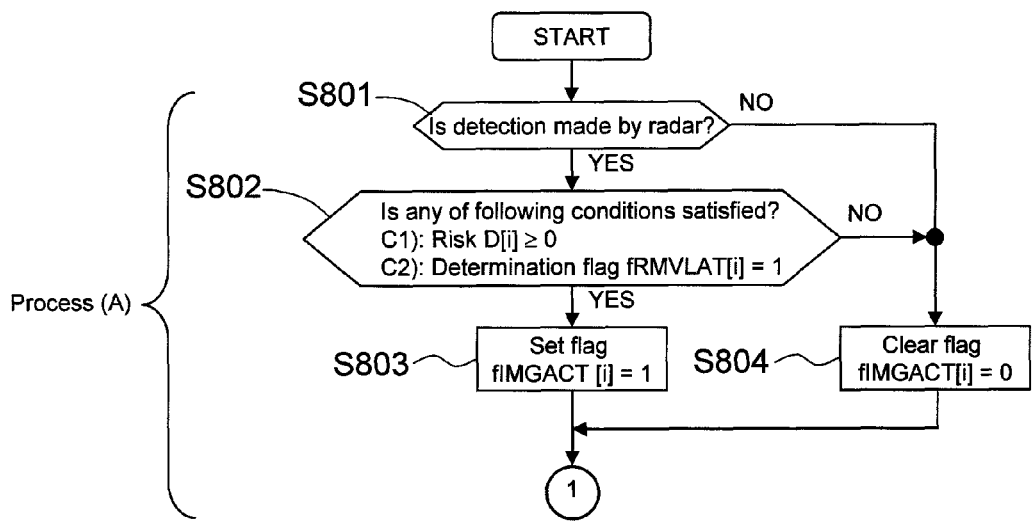
FIG. 8 is a flowchart showing processing details of object selection means.

FIG. 8 is a flowchart showing details of a Process (A) that selects a candidate of the object (hereinafter, referred to as an image processing candidate object) to be individually identified by the image processing from the object detected by the radar according to the risk D[i] computed by the first collision determination means 103 and the determination flag fRMVLAT[i] computed by the second collision determination means 104.

Figure 9:
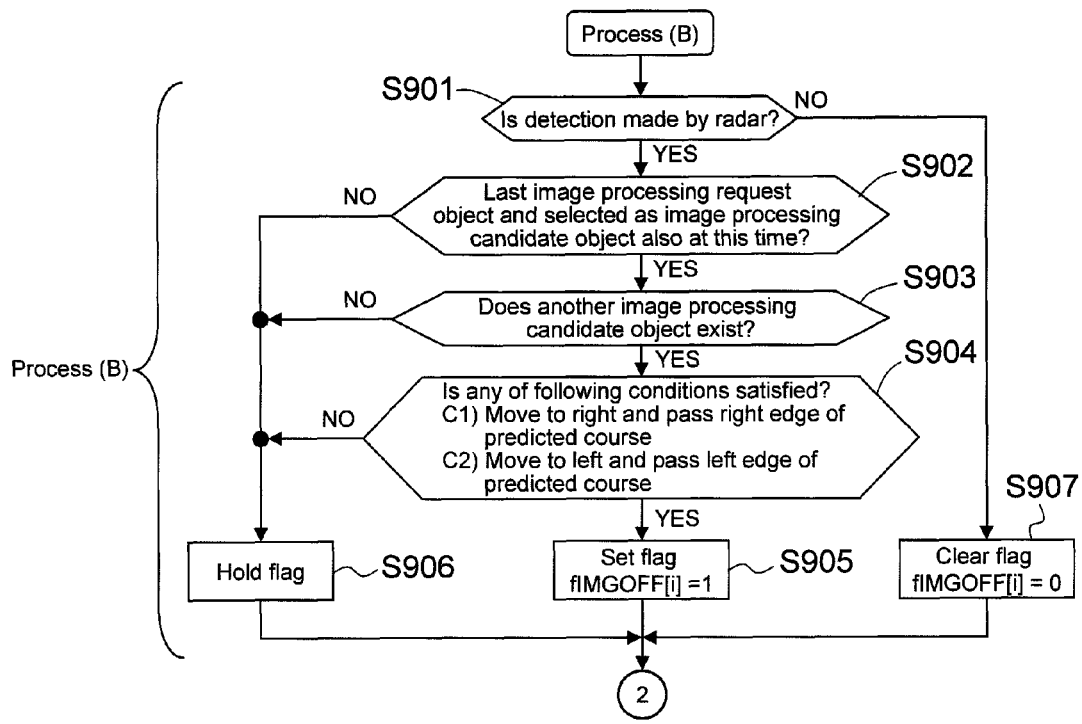
FIG. 9 is a flowchart showing processing details of the object selection means.

FIG. 9 is a flowchart showing details of a Process (B) that, in a case where an image processing candidate object other than the object image-processed in the last cycle exists, determines whether to omit the object image-processed in the last cycle from the image processing candidate objects or not.

Figure 10:
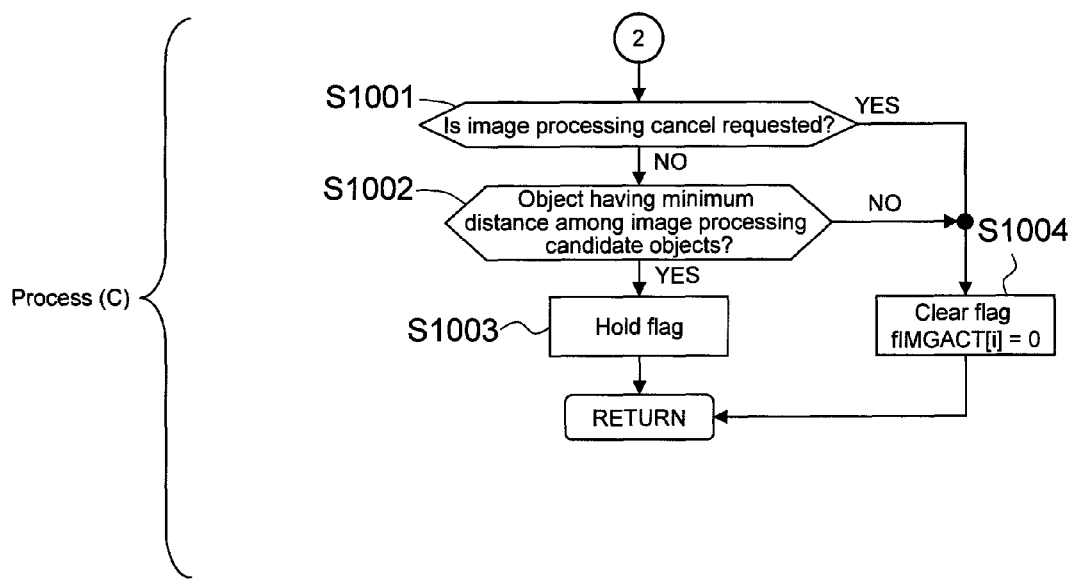
FIG. 10 is a flowchart showing processing details of the object selection means.

FIG. 10 is a flowchart showing details of a Process (C) that selects the object (hereinafter, referred to as an image processing request object) to be individually identified by image processing from among a plurality of image processing candidate objects using the results of FIGS. 8 and 9.

In the Process (A) in FIG. 8, in step S801, it is determined whether the radar detects the object or not; if not detected, the processing proceeds to step S804, and the flag fIMGACT[i] for determining whether to be the image processing request object or not is cleared.

If the radar detects the object, the processing proceeds to step S802; it is determined whether the detected object is individually identified by the image processing or not according to the risk D[i] and the determination flag fRMVLAT[i].

Here, it is determined whether following any of Conditions C1 and C2 is satisfied or not.

C1): risk D[i]≥0

C2): determination flag fRMVLAT[i]=1

If any of the Conditions C1 and C2 is satisfied, the processing proceeds to step S803; the determination flag fIMGACT[i] for representing to be an image processing request object (selection candidate object) is set, and the processing proceeds to the Process (B) in FIG. 9. In step S802, if neither the Conditions C1 nor C2 is satisfied, the processing proceeds to step S804; the determination flag fIMGACT[i] is cleared, and the processing proceeds to the Process (B) in FIG. 9.

As described above, the Process (A) in FIG. 8 allows selecting the object close to the center of the predicted course of the host vehicle, the object whose relative velocity vector indicates approaching the host vehicle, and the object crossing the predicted course from the outside of the predicted course after the inter-vehicle time has elapsed, from among the detected objects detected by the radar.

In the Process (B) shown in FIG. 9, in step S901, it is determined that the radar detects the object or not; if not detected, the processing proceeds to step S907, and the determination flag fIMGOFF[i] for determining whether the object image-processed in the last cycle is omitted or not is cleared.

If the radar detects the object, the processing proceeds to step S902, and it is determined whether the detected object is the last image processing request object and the object selected as the image processing candidate object also at this time (hereinafter, referred to as a reselection candidate object) or not.

For instance, if the results computed by the Processes (A) to (C) in the last cycle are the determination flag fIMGACT[i]=1 and the result computed by the Process (A) in this cycle is the determination flag fIMGACT[i]=1, it is determined that the condition is satisfied and the processing proceeds to step S903. If this condition is not satisfied, the processing proceeds to step S906, the value of the determination flag fIMGOFF[i] is held and the processing proceeds to the Process (C).

Next, in step S903, it is determined whether the image processing candidate object selected by the Process (A) other than the reselection candidate object exists or not. If another image processing candidate object exists, the processing proceeds to step S904. If another image processing candidate object does not exist, the processing proceeds to step S906, the value of the determination flag fIMGOFF[i] is held and the processing proceeds to the Process (C) shown in FIG. 10.

In step S904, it is determined whether the reselection candidate object passes to the outside of the predicted course or not. This determination is made on the basis of following Conditions C3) and C4). If any of Conditions C3) and C4) is satisfied, the processing proceeds to step S905, the determination flag fIMGOFF[i] is set and the processing proceeds to Process (C) in FIG. 10. In step S904, if neither the following Conditions C3) nor C4) is satisfied, the processing proceeds to step S906, the value of the determination flag fIMGOFF[i] is held and the processing proceeds to Process (C).

C3): move to the right and pass the right edge of the predicted course

C4): move to the left and pass the left edge of the predicted course

More specifically, the Conditions C3) and C4) are represented by following Expressions (21) and (22), respectively.

$$PXR[i] \leq XL[i] \text{ and } VXR[i] \leq -0.5 \text{ m/s} \quad (21)$$

$$PXR[i] \geq XR[i] \text{ and } VXR[i] \leq +0.5 \text{ m/s} \quad (22)$$

As described above, if an image processing candidate object other than the object image-processed by Process (B) in the last cycle exists, it can be determined whether the object image-processed in the last cycle is omitted from the image processing candidate object or not.

In Process (C) shown in FIG. 10, in step S1001, it is determined whether the object that is the image processing request object at the last time and also selected as the image processing candidate at this time is omitted from the image processing candidate object or not. More specifically, if the condition that the determination flag fIMGOFF[i]=1 is satisfied, the processing proceeds to step S1004, the determination flag fIMGACT[i] is cleared and the processing is finished. If the condition is not satisfied, the processing proceeds to step S1002.

In step S1002, it is determined whether the object has the smallest distance to the host vehicle or not among the image processing candidate objects. Here, it is determined whether the value of the longitudinal position PYR[i] is the smallest or not among that of the other image processing candidate objects, that is, among the objects with the determination flag fIMGACT[i]=1. If the value of the longitudinal position PYR [i] is the smallest, the processing proceeds to step S1003 in order to set the image processing candidate object as the pedestrian determination request object, the value of the determination flag fIMGACT[i]=1 is held and the processing is finished.

On the other hand, if the value of the longitudinal position PYR[i] is not the smallest, the processing proceeds to step S1004, the determination flag fIMGACT[i] is cleared and the processing is finished. In the above method, the object is selected by determining whether the value of the longitudinal position PYR[i] representing the distance to the host vehicle is the smallest or not. However, the pedestrian determination request object may be selected by determining whether the THWR[i] (inter-vehicle time) or the predicted collision time ($\cong$PYR[i]/VYR[i]), instead of the longitudinal position PYR[i], is the smallest or not.

As described above, Process (C) allows the image processing request object to be selected from among the image processing candidate objects, thereby enabling the image processing load to be reduced.

Next, referring to FIG. 11, processing details of the pedestrian determination means 106 will be described.

Figure 11:
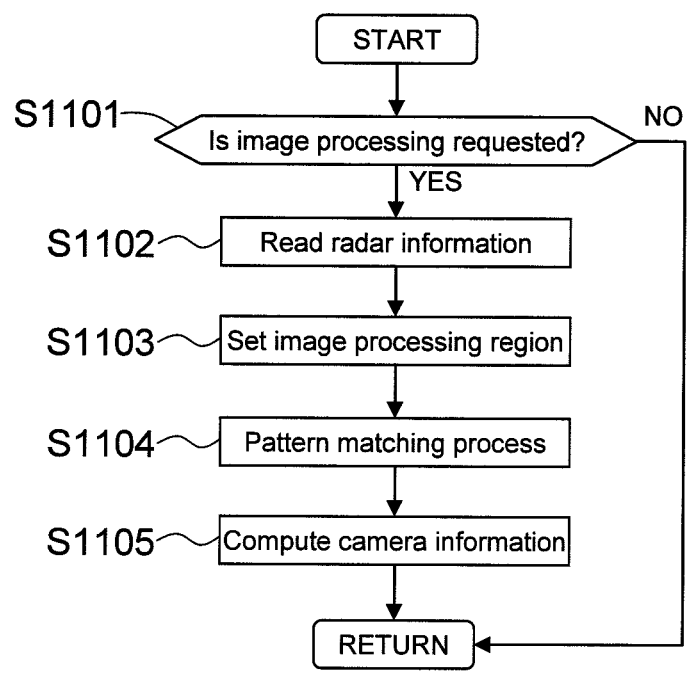
FIG. 11 is a flowchart showing processing details of pedestrian determination means.

FIG. 11 is a flowchart showing details of processing of determining a pedestrian by an image processing according to the radar information (the lateral position PXR[i], the longitudinal position PYR[i], the lateral velocity VXR[i], the longitudinal velocity VYR[i] and the width WDR[i]) acquired by the object information acquisition means 101 and the determination flag fIMGACT[i] computed by the object selection means 105.

First, in step S1101, it is determined whether an image processing request is output to the object detected by the radar or not according to the value of the determination flag fIMGACT[i] computed by the object selection means 105. If the condition of the determination flag fIMGACT[i]=1 is satisfied, it is determined that the object is the pedestrian determination request object and the image processing request has been output and the processing proceeds to step S1102. If the condition is not satisfied, the processing is finished.

In step S1102, the radar information (the lateral position PXR[i], the longitudinal position PYR[i], the lateral velocity VXR[i], the longitudinal velocity VYR[i] and the width WDR[i]) acquired by the object information acquisition means 101 is read. In step S1103, a processing region on an image is set on the basis of the radar information and the camera geometric model (relationship between a position on the image and an actual position).

Figure 12:
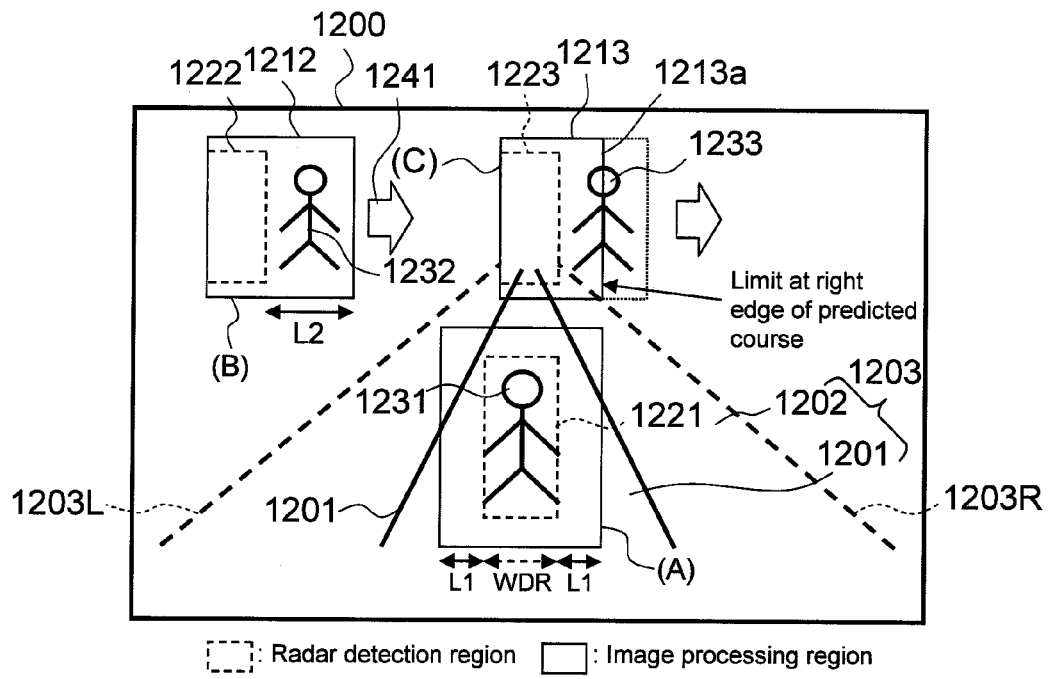
FIG. 12 is a table and a schematic diagram showing setting patterns of an image processing region.

Here, referring to FIG. 12, a method of setting the image processing region in the above step S1103 will be described.

FIG. 12(a) is a table showing a condition for selecting a setting pattern for the image processing region. FIG. 12(b) is a schematic diagram showing a setting pattern for the image processing region. In FIG. 12(b), a predicted course 1203 includes a central region 1201 and side regions 1202 set along both sides of the central region 1201. The central region 1201 has a size substantially identical to the vehicle width of the host vehicle. The side region 1202 is set to a size of half the vehicle width.

First, the setting pattern of the image processing region of a condition No. 1 will be described.

A setting pattern of the image processing region of condition No. 1 is for determining an immobile object that is not moving in the lateral direction (the vehicle width direction of the host vehicle). As shown in FIG. 12(a), among the image processing request objects, on an image processing request object where a condition that the lateral velocity VXR[i] is not more than a prescribed value (e.g., not more than 0.5 m/s) is satisfied and conditions that the risk D1[i]≥0 (the object exists on the predicted course 1203) and the determination flag fRMVLAT[i]=0 (the object is detected outside of the predicted course 1203, and does not cross the predicted course 1203 after the inter-vehicle time has elapsed) are satisfied, the setting pattern (A) of the image processing region is selected and set as the setting pattern of the image processing region denoted by reference symbol (A) in FIG. 12(b).

Provided that a delay time from detection of the object by the radar to execution of the image processing, such as pattern matching, is t_delay(s), an allowance L1[i] of the image processing region in the lateral direction is represented by a following Expression (23).

$$L1[i] = \text{prescribed value (e.g., 0.5 m/s)} \times t\_delay \quad (23)$$

Here, since the image processing request object 1231 whose lateral velocity VXR[i] is not more than a prescribed value is in a state close to the immobile state, it is indefinite whether the object moves to any of right and left directions. Accordingly, measures are taken of adding an allowance L1[i] to both the right and left sides of the width WDR[i] of the image processing request object 1231 detected by the radar. Therefore, the image processing region limitation values XLC[i] and XRC[i] in the lateral direction are represented by following Expressions (24) and (25).

$$XLC[i] \text{ (left)} 32\, PXR[i] - WDR[i]/2 - L1[i] \qquad (24)$$

$$XRC[i] \text{ (right)} = PXR[i] + WDR[i]/2 + L1[i] \qquad (25)$$

Next, a setting pattern of the image processing region of a condition No. 2 will be described.

The setting pattern of the image processing region of the condition No. 2 is for determining a moving object that is moving outside the predicted course 1203 in the lateral direction (the vehicle width direction of the host vehicle). As shown in FIG. 12(*b*), among the image processing request objects, on an image processing request object where a condition that the lateral velocity VXR[i] is not less than a prescribed value (e.g., not less than 0.5 m/s) is satisfied and conditions that the risk D1[i]<0 (the object exists outside the predicted course 1203) and the determination flag fRMVLAT [i]=1 (the object is detected outside the predicted course 1203, and crosses the predicted course 1203 after the inter-vehicle time has elapsed) are satisfied, the setting pattern (B) of the image processing region is selected, and set as the setting pattern of the image processing region denoted by reference symbol (B) in FIG. 12(*b*).

Provided that the delay time from detection of the object by the radar to execution of the image processing, such as pattern matching, is t_delay(s), an allowance L2[i] of the image processing region in the lateral direction is represented by a following Expression (26).

$$L2[i] = VXR[i] \times t\_delay \qquad (26)$$

In this case, the lateral velocity VXR[i] is large. Accordingly, if the allowances L2[i] are provided on both the right and left sides as with the pattern (A), the image processing load is increased. On the other hand, in a case where the lateral velocity VXR[i] is sufficiently large as with the setting pattern (B), measures are taken of providing the allowance L2 of the image processing region 1212 for a direction 1241 in which the object 1232 is moving because the moving direction of the object 1232 can be identified. Accordingly, image processing region limitation values XLC[i] and XRC[i] in the lateral direction are represented by following Expressions (27) and (28).

$$XLC[i] \text{ (left)} = PXR[i] - WDR[i]/2 \qquad (27)$$

$$XRC[i] \text{ (right)} = PXR[i] + WDR[i]/2 + L2[i] \qquad (28)$$

Further, a setting pattern of the image processing region of a condition No. 3 will be described.

The setting pattern of the image processing region of the condition No. 3 is for determining a moving object that is moving in the lateral direction (the vehicle width direction of the host vehicle) on the predicted course 1203. As shown in FIG. 12(*b*), among the image processing request objects, on an image processing request object where a condition that the lateral velocity VXR[i] is not less than a prescribed value (e.g., not less than 0.5 m/s) is satisfied, and the risk D1[i]≥0 (the object exists on the predicted course 1203) and the determination flag fRMVLAT[i]=1 (the object is detected outside the predicted course 1203 and crosses the predicted course 1203 after the inter-vehicle time has elapsed) are satisfied, the setting pattern (C) of the image processing region is selected, and set as the setting pattern of the image processing region denoted by reference symbol (C) in FIG. 12(*b*). The allowance L2[i] of the image processing region in the lateral direction is calculated by Expression (26) as with the pattern (B).

Here, the image processing request object 1233 passes through the right edge 1203R of the predicted course 1203 and moves out of the predicted course 1203. Accordingly, in order to further reduce the image processing load, it is preferable to limit the image processing region 1213 at the right edge 1203R of the predicted course 1203 indicated by a boundary 1213*a* in FIG. 12(*b*).

Accordingly, although image processing region limitation values XLC[i] and XRC[i] in the lateral direction are represented by the above Expressions (27) and (28) as with the pattern (B), the limitation value XRC[i] on the right side of the image processing region 1213 is further limited using a following Expression (29). Here, function sqrt{ } is a function of calculating the square root of a value in { }.

$$XRC[i] \text{ (right)} \le R - \text{sqrt}\{(R - WC)^2 - PYR[i]^2\} \qquad (29)$$

Returning to FIG. 11, after the image processing region is set in step S1103, the processing proceeds to step S1104, a process, such as pattern matching that scans the processing region set using the image data taken by the camera, is performed, and it is determined whether the object is a pedestrian or not.

Here, referring to FIG. 13, an overview of the pattern matching process in the above step S1104 will be described.

Figure 13:
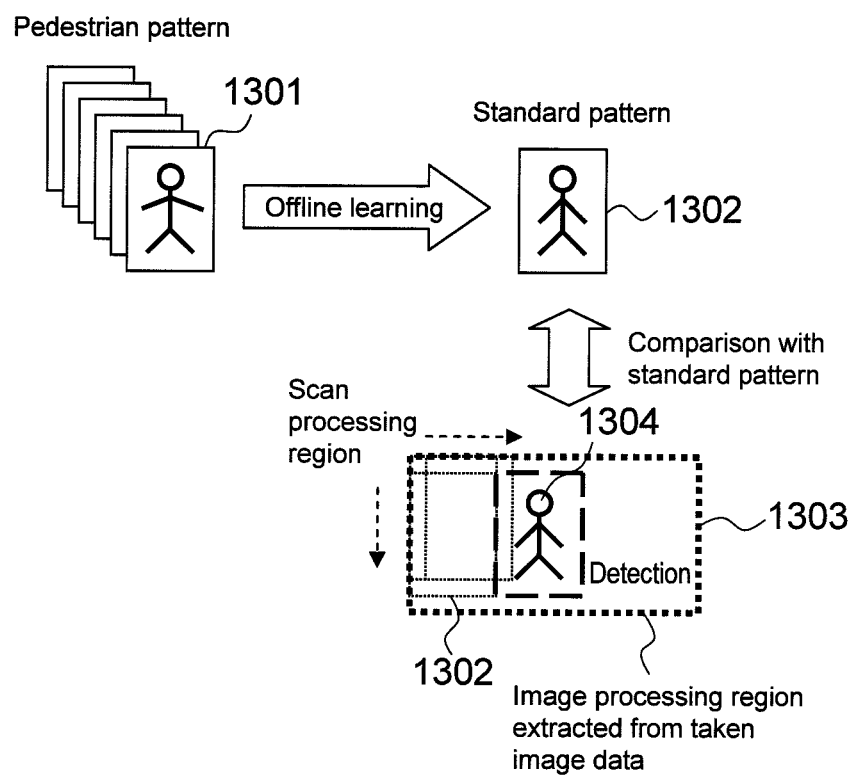
FIG. 13 is a schematic diagram for illustrating a pattern matching process of determining a pedestrian.

FIG. 13 is a schematic diagram showing a pattern matching process in a case of determining a pedestrian by an image processing.

First, a plurality of pedestrian patterns 1301 different in attitude, costume, size and the like from each other are preliminarily prepared. A standard pattern 1302 analogous to the pedestrians is acquired by offline learning. The standard pattern 1302 acquired by the offline learning is stored in the external environment recognition device 100 for a vehicle. In step S1104, the standard pattern 1302 is scanned using the stored standard pattern 1302 in the longitudinal and lateral directions in the image processing region 1303 set in step S1103, the image data taken by the camera and the standard pattern 1302 are compared with each other, and thereby similarity between the image data and the standard pattern 1302 is calculated. If the calculated similarity is at least a prescribed threshold, it is determined that a pedestrian is detected and the processing proceeds to step S1105.

Returning to FIG. 11, in step S1105, information, such as the lateral position PXC[i], the longitudinal position PYC[i], the lateral velocity VXC[i], the longitudinal velocity VYC[i] and the width WDC[i] of the object 1304 determined as a pedestrian by the pattern matching process in step S1104, is calculated, and the processing is finished.

As described above, the processing region of the image data taken by the camera can appropriately be set using the information of the object acquired by the object information acquisition means 101 and the results of the first and second collision determination means 103 and 104. Accordingly, the object can be detected quickly and securely, and the processing region can be narrowed. This allows assurance of safety and reduction in image processing load in a compatible manner.

Next, referring to FIG. 14, processing details of the fusion means 107 will be described.

Figure 14:
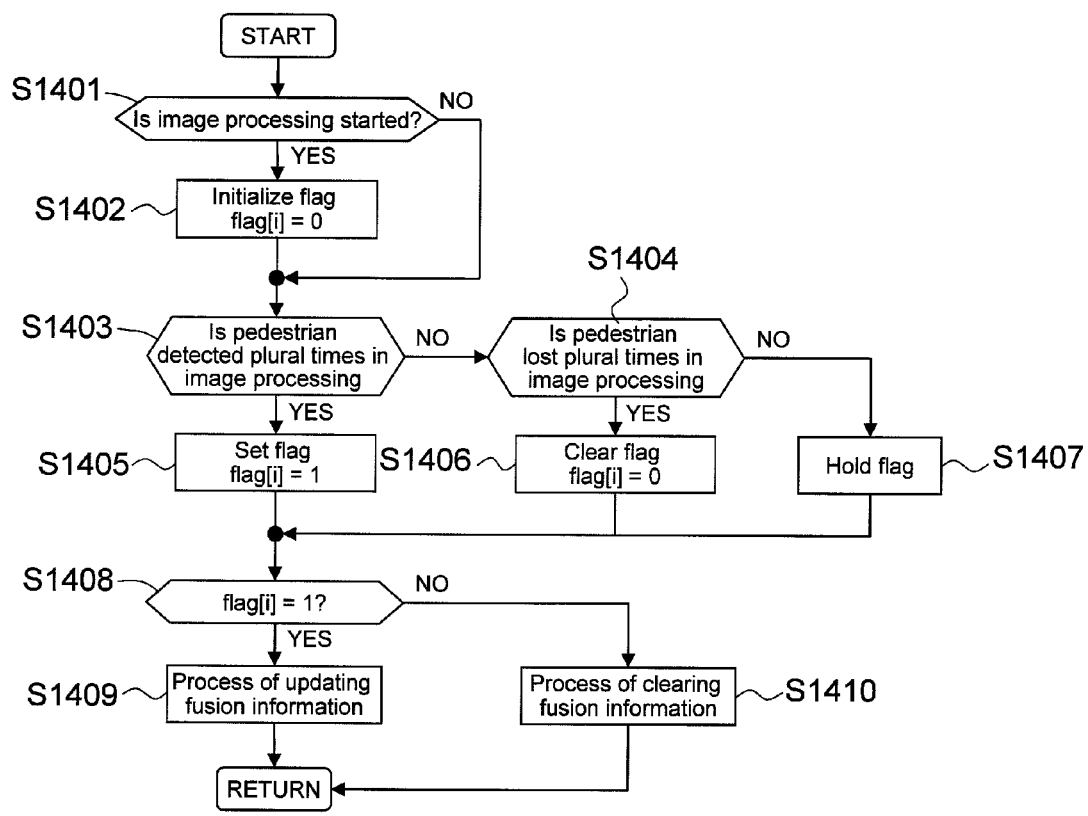
FIG. 14 is a flowchart showing processing details of fusion means.

FIG. 14 is a flowchart showing details of processing of generating fusion information (the lateral position PX[i], the longitudinal position PY[i], the lateral velocity VX[i], the longitudinal velocity VY[i] and the width WD[i]) by integrating the radar information (the lateral position PXR[i], the longitudinal position PYR[i], the lateral velocity VXR[i], the longitudinal velocity VYR[i] and the width WDR[i]) acquired by the object information acquisition means 101 and the camera information (the lateral position PXC[i], the longitudinal position PYC[i], the lateral velocity VXC[i], the longitudinal velocity VYC[i] and the width WDC[i]) computed by the pedestrian determination means 106.

First, in step S1401, it is determined whether pattern matching according to an image processing by the pedestrian determination means 106 is started or not; if the image processing is started, the processing proceeds to step S1402, and an update flag flag[i] is initialized.

Next, in step S1403, it is determined whether the pattern matching according to the image processing by the pedestrian determination means 106 detects a pedestrian or not; if detection is made at a prescribed times, the processing proceeds to step S1405, the update flag flag[i] is set and the processing proceeds to step S1408.

If the condition is not satisfied in step S1403, the processing proceeds to step S1404, and it is determined whether the pattern matching according to the image processing loses the pedestrian or not. If the pattern matching according to the image processing loses (does not detect) the pedestrian at the prescribed times in step S1404, the processing proceeds to step S1406, the update flag flag[i] is cleared and the processing proceeds to step S1408.

If the condition is not satisfied in step S1404, the processing proceeds to step S1407, the value of the update flag flag[i] is held and the processing proceeds to step S1408. If the update flag flag[i] is set in step S1408, the processing proceeds to step S1409, following processes of Expressions (30) to (34) that integrate the radar information and the camera information and updates the fusion information are executed, and the processing is finished.

$$PX[i]=PXC[i] \quad (30)$$

$$PY[i]=PYR[i] \quad (31)$$

$$VX[i]=VXC[i] \quad (32)$$

$$VY[i]=VYR[i] \quad (33)$$

$$WD[i]=WDC[i] \quad (34)$$

If the condition in step S1408 is not satisfied, the processing proceeds to step S1410, processes of clearing fusion information as shown in following Expressions (35) to (39) are executed, and the processing is finished.

$$PX[i]=0 \quad (35)$$

$$PY[i]=0 \quad (36)$$

$$VX[i]=0 \quad (37)$$

$$VY[i]=0 \quad (38)$$

$$WD[i]=0 \quad (39)$$

As described above, the fusion means 107 generates the fusion information in consideration of the number of detection of the pedestrian in the pattern matching according to the image processing by the pedestrian determination means 106. This allows an object misdetected in the pattern matching according to the image processing to be excluded. As shown in the above Expressions (30) to (34), the fusion information is generated by adopting the radar information as the position and the velocity in the longitudinal direction and adopting the camera information as the position and the velocity in the lateral direction, thereby allowing improvement in accuracy of recognizing the pedestrian to be facilitated.

Next, processing details of the integrated collision determination means 108 will be described.

The integrated collision determination means 108 computes the risk Df[i] according to the turning radius R computed by the predicted course setting means 102 and the fusion information (the lateral position PX[i], the longitudinal position PY[i], the lateral velocity VX[i], the longitudinal velocity VY[i] and the width WD[i]) generated by the fusion means 107.

The risk Df[i] is calculated in computation of the risk D[i] by the first collision determination means 103 using the fusion information instead of the radar information (the lateral position PXR[i], the longitudinal position PYR[i], the lateral velocity VXR[i], the longitudinal velocity VYR[i] and the width WDR[i]).

The external environment recognition device 100 for a vehicle outputs the fusion information generated by the fusion means 107 and the risk Df[i] computed by the integrated collision determination means 108 to the control device 200.

Next, referring to FIG. 15, for instance in a pre-crash safety system, processing details of the control device 200 that issues an alarm according to the risk Df[i] or computes an instruction value for automatically controlling vehicle brakes will be described.

Figure 15:
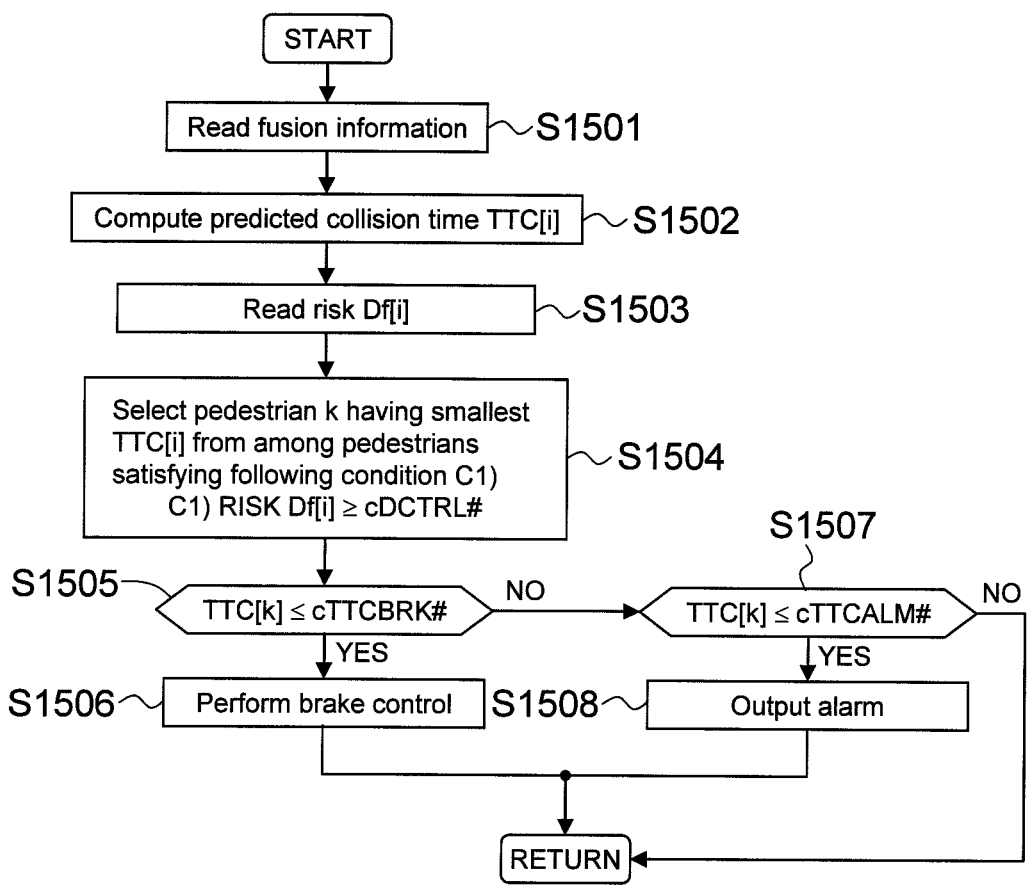
FIG. 15 is a flowchart showing processing details of a control device.

FIG. 15 is a flowchart showing processing details of the control device 200.

First, in step S1501, the fusion information (the lateral position PX[i], the longitudinal position PY[i], the lateral velocity VX[i], the longitudinal velocity VY[i] and the width WD[i]) is read. In step S1502, the predicted collision time TTC[i] of the object recognized by the external environment recognition device 100 for a vehicle is computed using a following Expression (40).

$$TTC[i]=PY[i]/VY[i] \quad (40)$$

Next, in step S1503, the risk Df[i] computed by the external environment recognition device 100 for a vehicle is read. In step S1504, pedestrians where a Condition C5) represented by a following Expression (41) is satisfied according to the risk Df[i] are selected, and the pedestrian (object) k that has the minimum predicted collision time TTC[i] is further selected from among the selected pedestrians.

$$Df[i] \geq cDCTRL\# \quad (41)$$

Here, a prescribed value cDCTRL# is a threshold for determining whether the recognized pedestrian k collides with the host vehicle or not. It is preferable to set this value to around cDCTRL#=0.5 with linkage to the process by the integrated collision determination means 108 and to select the pedestrian having a significantly high possibility of colliding with the host vehicle.

Next, in step S1505, it is determined whether the pedestrian k exists in an extent where the vehicle brakes are automatically controlled or not according to the predicted collision time TTC[k] of the selected pedestrian k. In a case where a following Expression (42) is established, the processing proceeds to step S1506, the instruction value for controlling the brakes (e.g., deceleration at 5.0 m/s$^2$) is computed and the processing is finished. If a following Expression (42) is not satisfied, the processing proceeds to step S1507.

$$TTC[k] \leq cTTCBRK\# \quad (42)$$

Here, the prescribed value cTTCBRK# is a threshold for determining whether the brake control is performed or not. It is preferable to set this value to around cTTCBRK#=0.6 sec. not to overlap with an evasive operation by a driver.

Next, in step S1507, it is determined whether the pedestrian k exists in an extent where an alarm is to be issued or not according to the predicted collision time TTC[k] of the selected pedestrian k. If a following Expression (43) is satisfied, the processing proceeds to step S1508, an instruction value for outputting the alarm is computed and the processing is finished. If the following Expression (43) is not satisfied, neither the brake control nor the alarm is not performed and the processing is finished.

$$TTC[k] \leq cTTCALM\# \quad (43)$$

Here, the prescribed value cTTCALM# is a threshold for determining whether the alarm is to be outputted or not. It is preferable to set the value to around cTTCALM#=1.4 sec. and to sufficiently secure a time from output of the alarm to execution of the brake control. This is because the driver can notice the pedestrian in front by means of the alarm, and the driver himself/herself performs a collision evasive operation, thereby avoiding collision before the brake control intervenes.

As described above, according to the vehicle system combining the external environment recognition device 100 for a vehicle and the control device 200, the pedestrian in front of the host vehicle can be recognized, and a safe driving support, such as a pre-crash safety system (alarm or brake control), can be performed on the recognized pedestrian.

Among the objects detected by the radar, on the object recognized as a pedestrian by the pedestrian determination means 106 and the fusion means 107, the threshold for determining whether to perform the brake control or not and the threshold for determining whether to output an alarm or not are set to 3.0 and 4.0 sec., respectively, and thus the pre-crash safety system (alarm or brake control) is operated sooner and control of gentle deceleration is performed. On another object, the respective thresholds are set to 0.6 and 1.4 sec., the pre-crash safety system (alarm or brake control) is operated immediately before the collision and control of rapid deceleration is performed. Thus, timing of the alarm and brake control can be changed according to the result of pattern matching of the image processing by the pedestrian determination means 106.

In the pattern matching according to the image processing, tradeoff between misdetection and undetection holds. Reduction in misdetection also reduces the rate of detecting pedestrian. However, adoption of the control method of the present invention allows the driver to be urged by issuing an alarm from a distance and performing gentle brake control on an object that can certainly be determined as a pedestrian among objects detected by the radar, and issues an alarm immediately before collision and performs brake control to reduce collision on the other objects (non-pedestrians, such as vehicles and utility poles). This enables complication to the driver to be suppressed and allows assurance of safety.

Figure 17:
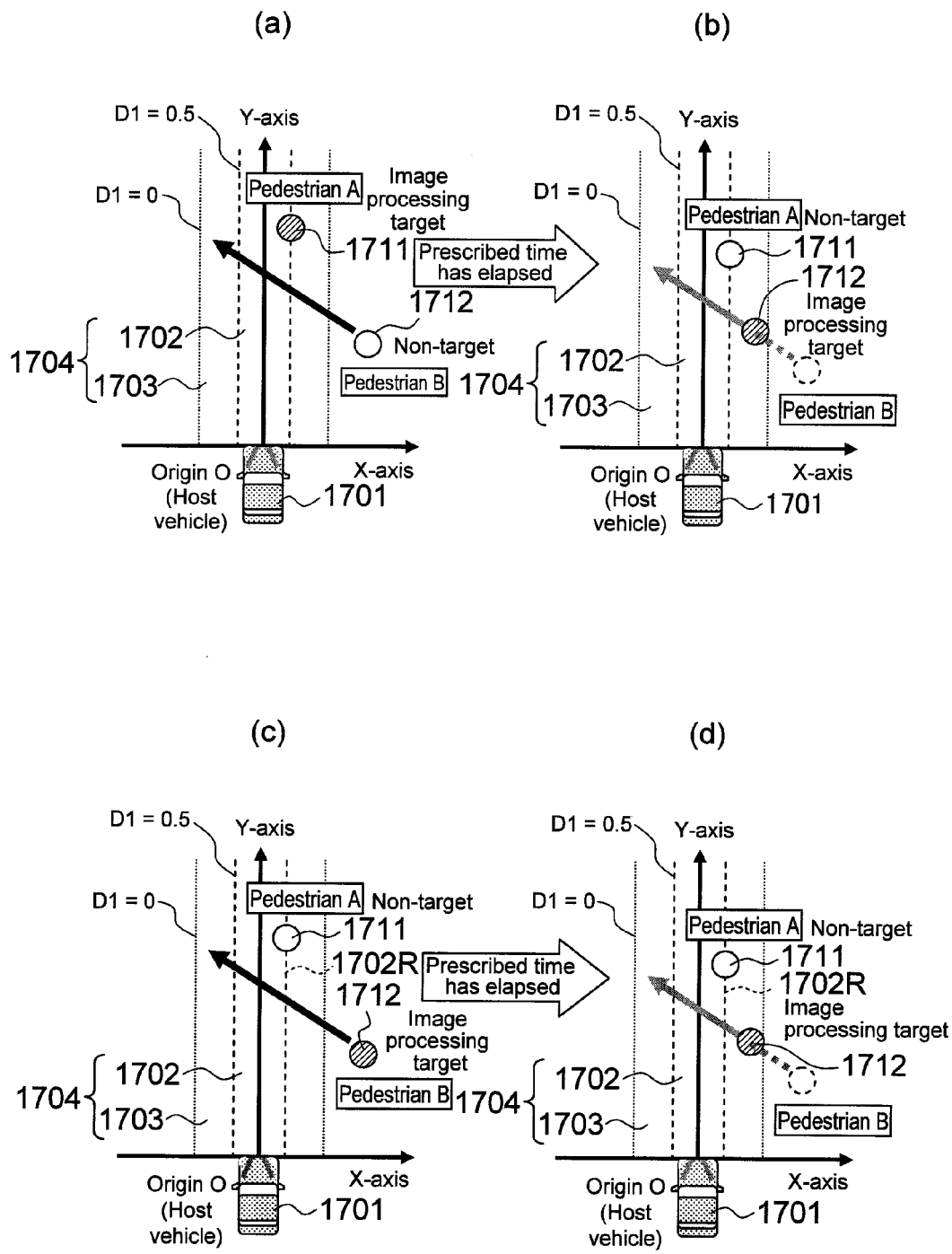
FIG. 17 is a schematic diagram showing a case where "a pedestrian immobile on the predicted course of the host vehicle in the distance" and "a pedestrian crossing from the outside of the predicted course of the host vehicle in the proximity" exist at the same time.
Figure 18:
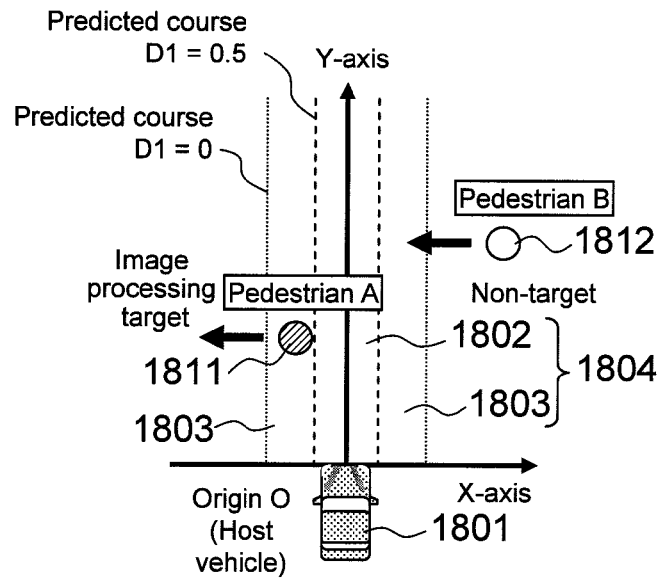
FIG. 18 is a schematic diagram showing a case where "a pedestrian moving to the left on the predicted course of the host vehicle in the proximity" exists and "a pedestrian crossing on the predicted course of the host vehicle from the outside (right) of the predicted course in the distance" newly appears.
Figure 18:
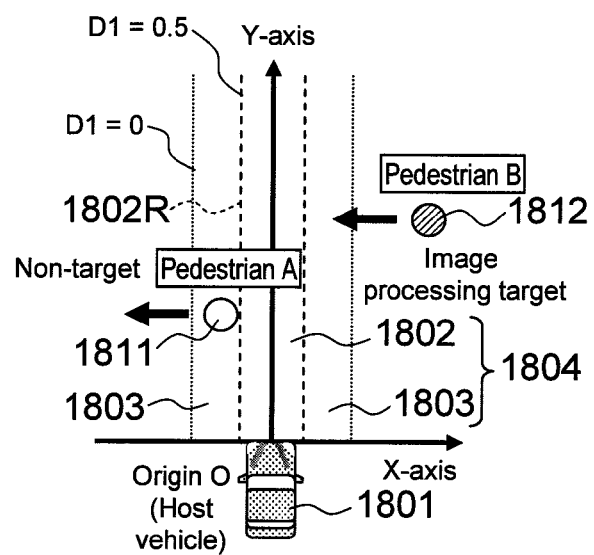

Next, referring to FIGS. 16, 17 and 18, advantageous effects of the present invention will be described.

Figure 16:
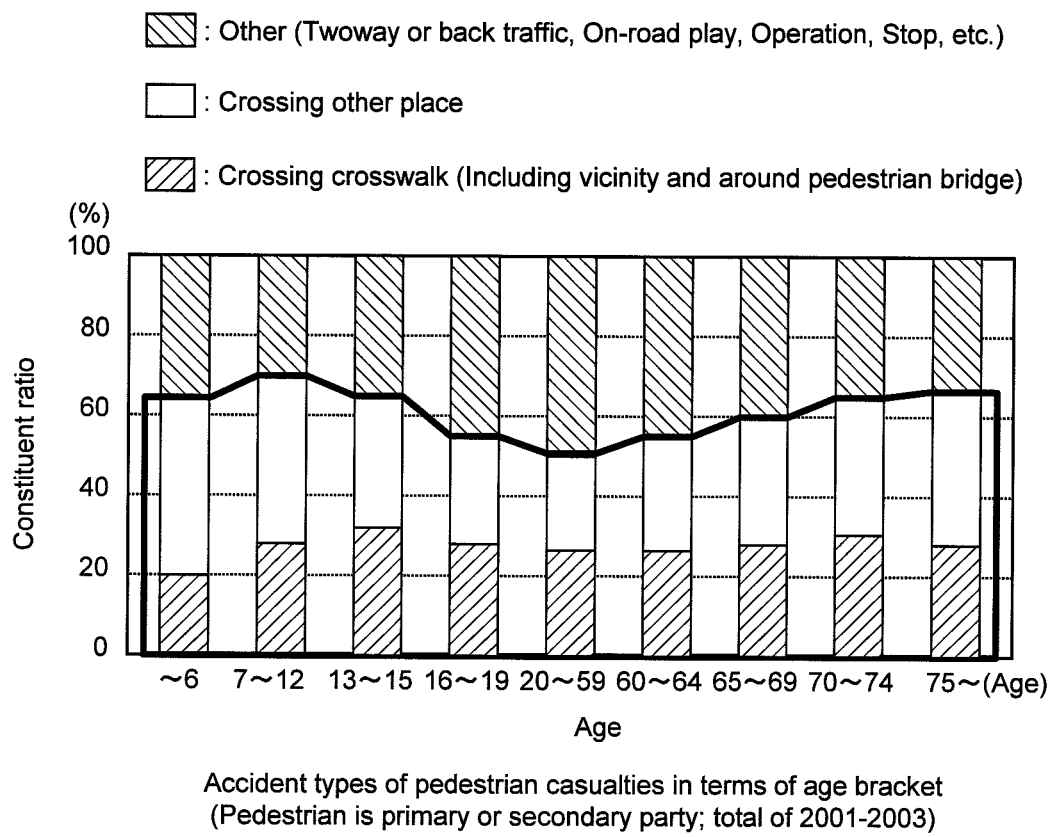
FIG. 16 statistical data classified according to accident types of pedestrian casualties in terms of age bracket.

FIG. 16 shows statistical data classified according to accident types of pedestrian casualties in terms of age bracket (ITARDA information No. 50, 2004; Institute for Traffic Accident Research and Data Analysis). The ordinate of the diagram represents component ratios of pedestrian accidents, and the abscissa thereof represents age brackets of pedestrian casualties.

On the whole, the ratio of "crossing" is high, representing approximately 60%. The ratio of crossing is particularly high in seniors and children. According to breakdown of "crossing", for children 6 years of age and under, the ratio of "crossing other place (place without crossing facilities in the vicinity)" is high, and the ratio of "crossing a crosswalk" is low. On the other hand, although not so much as children, also for seniors "crossing other place (place without crossing facilities in the vicinity)" is high.

FIGS. 17(a) and 17(b) are schematic diagrams showing problems in the conventional art. FIG. 17(a) shows a case where "a pedestrian A1711 at a distance immobile on the predicted course 1704 of the host vehicle 1701" and "a pedestrian B1712 crossing the predicted course 1704 from the outside of the predicted course 1704 of the host vehicle 1701" exist at the same time.

In this diagram, the host vehicle 1701 travels at a low vehicle velocity, and the pedestrian B1712 hastens to diagonally crossing in front of the host vehicle 1701 exists. In this case, since the longitudinal relative velocity of the pedestrian B 1712 with respect to the host vehicle 1701 is small, the first collision determination means 103 emphasizes the risk D1[i] based on the predicted course 1704 and calculates the risk D[i].

Accordingly, in FIG. 17(a), the pedestrian A1711 is selected as the target of the image processing. After a predetermined time elapses and subsequently the state transitions to that in FIG. 17(b), since the crossing pedestrian B1712 enters the predicted course 1704, the pedestrian B1712 is selected as the target of the image processing.

Therefore, in the pattern matching according to the image processing by the pedestrian determination means 106, there is a possibility that timing of determining the pedestrian B1712 in proximity to the host vehicle 1701 is delayed, an alarm and intervention of brake control concerning the crossing pedestrian B1712 are delayed and thus the safe driving support system is not effectively operated.

FIGS. 17(c) and 17(d) are schematic diagrams showing advantageous effects in a case of applying the present invention. FIG. 17(c) shows a situation identical to that in FIG. 17(a). FIG. 17(d) shows a situation identical to that in FIG. 17(b).

In this case, it is expected that the pedestrian B1712 detected outside the predicted course 1704 by the radar passes the right edge 1702R (equivalent to D1=0.5) of the central region 1702 and moves to the left after an inter-vehicle time elapses. Accordingly, the second collision determination means 104 and the object selection means 105 select this pedestrian as the image processing candidate object.

The pedestrian A1711 is also selected as the image processing candidate object by the first collision determination means 103 and the object selection means 105. Accordingly, the longitudinal relative positions of the pedestrians A1711 and B1712 are compared with each other, and the pedestrian B1712 having the shortest distance to the host vehicle 1701 is selected as the target of the image processing.

Until the predetermined time elapses and the state transitions to that in FIG. 17(d), the pedestrian B1712 continues to be selected as the target of the image processing. Accordingly, delay in timing of determining the pedestrian B1712 in the pattern matching according to the image processing by the pedestrian determination means 106 can be prevented. The alarm and intervention of brake control to the pedestrian B1712 in front are not delayed. This enables the safe driving support system to effectively operate without delay of the alarm and intervention of the brake control.

In a case where the pedestrian B1712 stops outside the predicted course 1704 and does not cross, the second collision determination means 104 determines that the pedestrian does not cross the predicted course 1704, and the target of the image processing is switched to the pedestrian A1711. This can contribute to reduction of crossing accident representing approximately 60% of the pedestrian accidents as shown in FIG. 16 without neglecting the safe driving support to the pedestrian A1711.

Next, referring to FIG. 18, a method of switching a target of the image processing will be described.

FIGS. 18(a) and 18(b) show schematic diagrams in a case where "a pedestrian A1811 moving to the left on the predicted course 1804 in the proximity" exists and "a pedestrian B 1812 crossing the predicted course 1804 from the outside (the right side) of the predicted course 1804 of the host vehicle 1801 at a distance" newly appears.

FIG. 18(a) shows a case where "a process that determines whether to omit the object image-processed in the last cycle from the image processing candidate object if the image processing candidate object other than the object image-processed in the last cycle exists" by the object selection means 105 of the present invention is not applied. The pedestrian A1811 continues to be selected as the target of the image processing.

In the scenes shown in FIGS. 18(a) and 18(b), the pedestrian A1811 is moving to the left in the side region 1803 of the predicted course 1804. In this case, the risk D1[i] is not more than 0.5, and the pattern matching according to the image processing has continued to be performed. Accordingly, as shown in FIG. 18(b), it is preferable to select the newly appearing pedestrian B1812 as the target of the image processing.

Here, "the process that determines whether to omit the object image-processed in the last cycle from the image processing candidate object if the image processing candidate object other than the object image-processed in the last cycle exists" by the object selection means 105 is applied, and a flag is set for canceling the image processing request on the object 1811 that is passing the left edge 1802R of the central region 1802 of the predicted course 1804 (risk D1[i]≤0.5) and moving to the left.

Accordingly, the pedestrian A1811 thus passing outwardly beyond the central region 1802, which is a path equivalent to the host vehicle width on the predicted course 1804, can be omitted from the image processing candidate object, and the newly appearing pedestrian B1812 can be selected as the target of the image processing (image processing request object).

Next, referring to FIG. 19, another embodiment of the object information acquisition means 101 of the present invention will be described.

Figure 19:
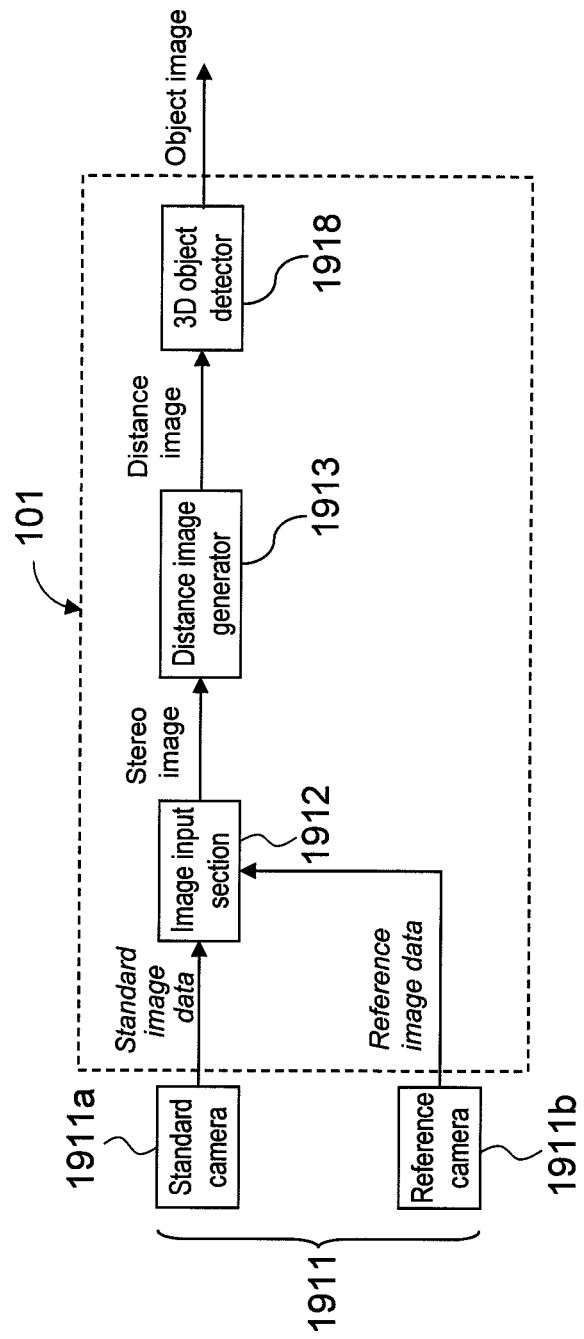
FIG. 19 is a block diagram showing a configuration in a case where object information acquisition means acquires object information according to image data taken by a stereo camera.

FIG. 19 is a configurational diagram in a case of acquiring object information according to image data taken by a stereo camera 1911 including a standard (left) camera 1911a and a reference (right) camera 1911b.

First, an image input section 1912 performs an interface process that acquires data of a standard image (left) and a reference image (right) taken by the respective cameras 1911a and 1911b.

Next, a distance image generator 1913 generates a distance image according to the stereo image data of the standard image (left) data and the reference image (right) data acquired by the image input section 1912.

A three-dimensional object detector 1918 performs a process that extracts a three-dimensional object using the distance image data generated by the distance image generator 1913, a model in which a road plane is assumed and the like, and computes a relative position PXR[i] of the three-dimensional object in the vehicle width direction of the host vehicle, a relative position PYR[i] in the direction of the entire length of the host vehicle, a relative velocity VXR[i] in the vehicle width direction of the host vehicle, a relative velocity VYR[i] in the direction of the entire length of the host vehicle, and the width WDR[i], on the basis of a camera geometric model (relationship between the position on the image and the actual position).

As described above, the stereo camera is used instead of the radar in FIG. 1, and the object information can be acquired according to the image data taken by the stereo camera. In this case, the pedestrian determination means 106 selects any of the standard image (left) and the reference image (right) as the imaged data, and determines whether the three-dimensional object extracted in the pattern matching according to the image processing is a pedestrian or not.

The invention claimed is:

1. An external environment recognition device for a vehicle that recognizes an external environment of the vehicle on the basis of detected object information of a plurality of detected objects in front of a host vehicle, image information of an image in front of the host vehicle, and host vehicle information of a detected status of the host vehicle, comprising:

predicted course setting means for setting a predicted course of the host vehicle on the basis of the host vehicle information;

first collision determination means for computing a risk of collision of each of the detected objects with the host vehicle on the basis of the predicted course set by the predicted course setting means and the detected object information;

second collision determination means for determining whether each of the detected objects enters the predicted course from outside of the predicted course or not on the basis of the predicted course and the detected object information;

object selection means for selecting the detected object having the risk computed by the first collision determination means at least a preset first threshold and the detected object determined by the second collision determination means to enter the predicted course as selection candidate objects among the detected objects, and for selecting the selection candidate object having a minimum relative distance to the host vehicle or a minimum predicted collision time as a pedestrian determination request object from among the selected selection candidate objects; and pedestrian determination means for determining whether the pedestrian determination request object selected by the object selection means is a pedestrian or not using the image information;

wherein, in a case where the selection candidate object selected as the pedestrian determination request object in a last process is included in the selected selection candidate objects, the object selection means identifies the selected selection candidate object as a reselection candidate object, and determines whether to omit the reselection candidate object from a selection candidate of the pedestrian determination request object or not on the basis of the predicted course and the detected object information.

2. The external environment recognition device for a vehicle according to claim 1, wherein the pedestrian determination means sets an image processing region of the image information according to a result of determination by the first collision determination means on the pedestrian determination request object and a result of determination by the second collision determination means.

3. The external environment recognition device for a vehicle according to claim 1, wherein the pedestrian determination means, in a case where determining the pedestrian determination request object as a pedestrian, calculates camera information of the pedestrian determination request object on the basis of the image information.

4. The external environment recognition device for a vehicle according to claim 3, further comprising fusion means for integrating the detected object information and the camera information and generating fusion information of the pedestrian determination request object determined as the pedestrian by the pedestrian determination means.

5. The external environment recognition device for a vehicle according to claim 4, further comprising integrated collision determination means for computing a risk of collision of the host vehicle with the pedestrian determination request object according to the fusion information generated by the fusion means.

6. A vehicle system including the external environment recognition device for a vehicle according to claim 5, comprising
control means for performing control for avoiding collision of the host vehicle in a case where the risk computed by the integrated collision determination means is less than a preset threshold.

7. The vehicle system according to claim 6, wherein the control means computes a predicted collision time at which the host vehicle is to collide with the pedestrian determination request object on the basis of the fusion information generated by the fusion means, compares the computed predicted collision time with a preset breaking threshold, and, if the predicted collision time is less than or equal to the breaking threshold, performs a brake control on the vehicle.

8. The vehicle system according to claim 7, wherein, if the predicted collision time is larger than the breaking threshold, the control means compares the predicted collision time with a preset warning threshold, and, if the predicted collision time is less than or equal to the warning threshold, performs a control of an alarm to the driver.

* * * * *